(12) United States Patent
Hirano et al.

(10) Patent No.: US 7,233,727 B2
(45) Date of Patent: Jun. 19, 2007

(54) OPTICAL FIBER AND OPTICAL DEVICE USING THE SAME

(75) Inventors: Masaaki Hirano, Yokohama (JP); Tetsuya Nakanishi, Yokohama (JP); Toshiaki Okuno, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/483,979

(22) Filed: Jul. 11, 2006

(65) Prior Publication Data

US 2007/0047962 A1 Mar. 1, 2007

Related U.S. Application Data

(60) Provisional application No. 60/697,535, filed on Jul. 11, 2005.

(51) Int. Cl.
*G02B 6/02* (2006.01)
*G02B 6/36* (2006.01)
*H04J 14/02* (2006.01)
*H04B 10/12* (2006.01)

(52) U.S. Cl. .................. 385/126; 385/123; 398/81; 398/148

(58) Field of Classification Search ........ 385/123–128; 398/29, 81, 147, 148, 159; 359/337.5, 615
See application file for complete search history.

(56) References Cited

U.S. PATENT DOCUMENTS 6,968,108 B2 * 11/2005 Beaumont et al. .......... 385/127

2002/0076186 A1 * 6/2002 de Montmorillon et al. .......................... 385/123

FOREIGN PATENT DOCUMENTS

| JP | 8-288930 A | 11/1996 |
|---|---|---|
| JP | 10-228040 A | 8/1998 |
| JP | 2004-287382 A | 10/2004 |
| JP | 2005-331818 A | 12/2005 |

OTHER PUBLICATIONS

Jaedeuk Lee, et al., "Design and Fabrication of a Nonzero-Dispersion Fiber with a Maximally Flat Dispersion Spectrum," IEEE Photonics Technology Letters, Apr. 2001, pp. 317-319, vol. 13, No. 4, IEEE.

(Continued)

*Primary Examiner*—Brian Healy
*Assistant Examiner*—Charlie Peng
(74) *Attorney, Agent, or Firm*—McDermott Will & Emery LLP

(57) ABSTRACT

This invention relates to an optical fiber and others having a structure for efficiently generating SC light while realizing high nonlinearity over a wide band. The optical fiber has at least a center core region, and an outside cladding region having a refractive index lower than that of the center core region and provided on an outer periphery of the center core region. The optical fiber has, as characteristics to light of a wavelength λ1 in a wavelength range of 1520 nm to 1620 nm, a chromatic dispersion of −2 ps/nm/km to +2 ps/nm/km, a dispersion slope of −0.009 ps/nm²/km to +0.009 ps/nm²/km, and a fourth-order dispersion of $-1.8 \times 10^{-4}$ ps/nm³/km to $+1.8 \times 10^{-4}$ ps/nm³/km.

18 Claims, 45 Drawing Sheets

OTHER PUBLICATIONS

Naomi Kumano, et al., "Zero Dispersion-Slope NZ-DSF with Ultra Wide Bandwidth over 300nm," ECOC, 2002, PD1.4.

C.G. Jorgensen, et al., "Dispersion Flattened Highly Non-Linear Fiber," ECOC-IDOC 2003 Proceedings, 2003, vol. 3, We3.7.6.

T. Okuno, et al., "Highly nonlinear and perfectly dispersion-flattened fibres for efficient optical signal processing applications," Electronics Letters, Jun. 26, 2003, vol. 39, No. 13.

Paul S. Westbrook, et al., "Improved Supercontinuum Generation Through UV Processing of Highly Nonlinear Fibers," Journal of Lightwave Technology, Jan. 2005, pp. 13-18, vol. 23, No. 1.

F. Poletti, et al., "Ultra-flattened dispersion holey fibers: genetic algorithm design and fabrication tolerances," Conference on Lasers & Electro-Optics, 2005, CMV7, pp. 387-389, vol. 1.

K.P. Hansen, "Dispersion flattened hybrid-core nonlinear photonic crystal fiber," Optics Express, Jun. 30, 2003, pp. 1503-1509, vol. 11, No. 13.

J.W. Nicholson, et al., "High power, single mode, all-fiber source of femtosecond pulses at 1550 nm and its use in supercontinuum generation," Optics Express, Jun. 28, 2004, pp. 3025-3034, vol. 12, No. 13.

K. Saitoh, et al., "Chromatic dispersion control in photonic crystal fibers: application to ultra-flattened dispersion," Optics Express, Apr. 21, 2003, pp. 843-852, vol. 11, No. 8.

Masaaki Hirano, et al., "Broadband Wavelength Conversion over 193-nm by HNL-DSF Improving Higher-order Dispersion Performance," ECOC 2005 Proceedings, 2005, pp. 43-44, vol. 6, Paper Th 4.4.4.

Toshiaki Okuno, "Highly-nonlinear Optical Fibers and Their Applications," SEI Technical Review, Jun. 2006, pp. 34-37, No. 62.

Search Report Issued in corresponding International Application No. PCT/JP2006/313700.

Masaaki Hirano, et al., "Ultra-Broadband Wavelength Conversion Demonstrated by Highly Nonlinear Fiber with improved $\beta_4$," 2006, p. 161.

Masaaki Hirano, et al., "Silica-based highly nonlinear fibers and their applications," IEICE Technical Report, 2005 Conference of the Electronics Society, Institute of Electronics, Information and Communication Engineers, pp. 39-42.

Masaaki Hirano, et al., "Numerical Study for Highly Nonlinear Dispersion Flattened Fiber," Sep. 7, 2005.

* cited by examiner

Fig.40

| SAMPLE | Ra | Disp at 1.58 ps/nm/km | min. slope 1.52 - 1.62 ps/nm²/km | min. 4th disp 1.52 - 1.62 10⁻⁴ps/nm³/km | 0.5 bandwidth nm | ZERO DISPERSION WAVELENGTH nm | | Aeff μm² | MFD μm | NONLINEAR COEFFICIENT 1/W/km | CUTOFF WAVELENGTH nm |
|---|---|---|---|---|---|---|---|---|---|---|---|
| 1 | 0.5 | -0.37 | 0 | 3 | 100 | 1.48 | 1.56 | 15.3 | 4.46 | 11.5 | 1230 |
| 2 | 0.55 | -0.47 | 0 | 2.7 | 110 | | | 15.9 | 4.53 | 11.1 | 1170 |
| 3 | 0.6 | -0.18 | 0 | 1.8 | 140 | 1.51 | 1.56 | 16.5 | 4.69 | 10.7 | 1130 |
| 4 | 0.65 | -0.22 | 0 | 1.1 | 170 | | | 17.1 | 4.71 | 10.3 | 1160 |
| 5 | 0.69 | -0.24 | 0 | 0.7 | 250 | 1.96 | | 17.7 | 4.78 | 10.0 | 1190 |
| 6 | 0.7 | -0.22 | 0.0013 | 0.6 | 320 | 1.87 | | 17.8 | 4.8 | 9.9 | 1200 |
| 7 | 0.71 | -0.44 | 0.0033 | 0.5 | 190 | 1.76 | | 17.9 | 4.82 | 9.9 | 1210 |
| 8 | 0.72 | -0.39 | 0.0055 | 0.4 | 140 | 1.63 | | 18.1 | 4.84 | 9.8 | 1220 |
| 9 | 0.73 | -0.43 | 0.0076 | 0.3 | 80 | 1.63 | | 18.2 | 4.87 | 9.8 | 1230 |
| 10 | 0.74 | -0.36 | 0.0099 | 0.3 | 50 | 1.61 | | 18.4 | 4.89 | 9.6 | 1240 |
| 11 | 0.75 | -0.34 | 0.012 | 0.3 | 50 | 1.61 | | 18.6 | 4.91 | 9.4 | 1250 |
| 12 | 0.8 | -0.14 | 0.023 | 0.1 | 30 | 1.59 | | 19.3 | 5.02 | 9.0 | 1300 |

Fig. 42

| SAMPLE | Ra | Disp at 1.58 ps/nm/km | min. slope 1.52-1.62 ps/nm²/km | min. 4th disp 1.52-1.62 10⁻⁴ps/nm³/km | 0.5 bandwidth nm | ZERO DISPERSION WAVELENGTH nm | ZERO DISPERSION WAVELENGTH nm | Aeff μm² | MFD μm | NONLINEAR COEFFICIENT 1/W/km | CUTOFF WAVELENGTH nm |
|---|---|---|---|---|---|---|---|---|---|---|---|
| 1 | 0.5 | -0.25 | 0 | 2.2 | 130 | | | 14.8 | 4.38 | 11.9 | 970 |
| 2 | 0.55 | -0.15 | 0 | 2.1 | 140 | | | 15.2 | 4.44 | 11.6 | 1000 |
| 3 | 0.6 | -0.37 | 0 | 1.8 | 150 | | | 15.6 | 4.51 | 11.3 | 1020 |
| 4 | 0.65 | -0.41 | 0 | 1.3 | 170 | | | 16.1 | 4.58 | 10.9 | 1060 |
| 5 | 0.7 | -0.16 | 0.0022 | 1 | 230 | 1.61 | 1.69 | 16.7 | 4.66 | 10.5 | 1090 |
| 6 | 0.72 | -0.33 | 0.0047 | 0.9 | 280 | 1.63 | 1.75 | 16.9 | 4.69 | 10.3 | 1100 |
| 7 | 0.73 | -0.28 | 0.0063 | 0.8 | 360 | 1.61 | | 17 | 4.7 | 10.3 | 1100 |
| 8 | 0.74 | -0.18 | 0.0074 | 0.8 | 280 | 1.6 | | 17.1 | 4.72 | 10.2 | 1110 |
| 9 | 0.75 | -0.22 | 0.0089 | 0.7 | 120 | 1.6 | | 17.2 | 7.73 | 10.1 | 1110 |
| 10 | 0.8 | -0.34 | 0.0156 | 0.5 | 40 | 1.6 | | 17.7 | 4.8 | 9.8 | 1140 |

OPTICAL FIBER AND OPTICAL DEVICE USING THE SAME

CROSS-REFERENCE TO RELATED APPLICATION

This application claims priority to Provisional Application No. 60/697,535 filed on Jul. 11, 2005 by the same Applicant, which is hereby incorporated by reference in its entirety.

BACKGROUND OF THE INVENTION

1. Field of the Invention

The present invention relates to an optical fiber and an optical device using the same.

2. Related Background Art

When light enters a highly nonlinear optical fiber, a nonlinear optical phenomena are generated in the optical fiber. Due to these nonlinear optical phenomena, light with a wavelength different from that of the incident light is newly generated in the optical fiber. Known optical devices making use of such nonlinear optical phenomena in optical fiber include, for example, light sources generating ultra-broadband (SuperContinuum) light, wavelength converters based on four-wave mixing, optical parametric amplifiers, and so on.

A dispersion-flattened optical fiber having a chromatic dispersion, whose absolute value is small and constant in a broad wavelength range, is often applied as a medium for realizing the generation of SC light, pulse compression, a switch constituted by a nonlinear optical loop mirror (NOLM), wavelength conversion, or the like. In such cases, it is often the case that better characteristics are achieved with increase of the nonlinearity of optical fiber and with expansion of the wavelength range where the chromatic dispersion is constant. However, little study from the viewpoint discussed above has been conducted heretofore.

Non-patent Document 1: J. Lee, et al., "Design and Fabrication of a Nonzero-Dispersion Fiber with a Maximally Flat Dispersion Spectrum," IEEE Photonics Technology Letters, Vol. 13, No. 4, pp. 317-319 (2001)

Non-patent Document 2: N. Kumano, et al., "Zero Dispersion-Slope NZ-FSF with UltraWide bandwidth over 300 nm," ECOC 2002, PD1.4

Non-patent Document 3: C. G. Joergensen, et al., "Dispersion Flattened Highly Non-Linear Fiber" ECOC-IOOC 2003, We3.7.6

Non-patent Document 4: T. Okuno, et al., "Highly nonlinear and perfectly dispersion-flattened fibres for efficient optical signal processing applications," Electronics Letters, Vol. 39, No. 13, pp. 972-974 (2003)

Non-patent Document 5: P. S. Westbrook, et al., "Improves Supercontinuum Generation Through UV Processing of Highly Nonlinear Fibers," Journal of Lightwave Technology, Vol. 23, No. 1, pp. 13-18 (2005)

Non-patent Document 6: F. Poletti, et al., "Ultra-flattened dispersion holey fibers: genetic algorithm design and fabrication tolerances," CLEO/QELS 2005, CMV7

SUMMARY OF THE INVENTION

The present inventors have examined the conventional optical fibers, and as a result, have discovered the following problems.

Namely, each of Non-patent Document 1 and Non-patent Document 2 describes the nonzero dispersion-shifted optical fiber having a small dispersion slope. However, the nonzero dispersion-shifted optical fiber has a large effective area (or mode field diameter) and low nonlinearity. Non-patent Document 3 describes the dispersion-flattened optical fiber with high nonlinearity. However, the dispersion-flattened optical fiber of this type has the nonzero dispersion slope (see FIG. 2 in Non-patent Document 3) and thus demonstrates some slope of a dispersion spectrum (see FIG. 1 in Non-patent Document 3).

Non-patent Document 4 also describes the dispersion-flattened optical fiber with high nonlinearity. The dispersion-flattened optical fiber disclosed in this Non-patent Document 4 has the dispersion slope in which there is a perfectly zero point (see FIG. 1 in Non-patent Document 4). On the other hand, the dispersion slope of the dispersion-flattened optical fiber disclosed in this Non-patent Document 4 demonstrates significant wavelength dependence and thus the band where the dispersion slope is small and where the chromatic dispersion is flat is not so wide. Non-patent Document 5 discloses the technique of changing the dispersion curve of the optical fiber by irradiating the optical fiber of Non-patent Document 3 with ultraviolet light. However, the absolute value of dispersion is large as indicated by a symbol "∘" shown in FIG. 5($a$) in this Non-patent Document 5.

Non-patent Document 6 describes the study on the dispersion-flattened optical fiber of holey fiber. The calculation results assure capability of fabrication of optical fiber with good characteristics, but it is extremely difficult in practical fabrication to uniform all locations and sizes of holes in the holey fiber. For this reason, there are problems to be solved, including (1) fabrication itself is difficult, (2) the polarization mode dispersion is large, and (3) splice with a standard optical fiber is difficult.

As described above, the optical fibers described in respective Non-patent Documents 1 to 5 listed above had the low nonlinearity, or the narrow width of the band where the chromatic dispersion was flat. It was also difficult to put the optical fiber described in Non-patent Document 6, into practical use.

The present invention has been developed to eliminate the problems described above. It is an object of the present invention to provide an optical fiber having a structure for efficiently generating SC light while realizing high nonlinearity with small chromatic dispersion over a wide wavelength range, and an optical device using the optical fiber as a medium for realizing the efficient generation of SC light or the like.

An optical fiber according to the present invention comprises at least a center core region, and an outside cladding region having a refractive index lower than that of the center core region and provided on an outer periphery of the center core region. The optical fiber has, as characteristics with respect to light of a wavelength $\lambda 1$ in a wavelength range of 1520 nm to 1620 nm, a chromatic dispersion of −2 ps/nm/km to +2 ps/nm/km, a dispersion slope of −0.009 ps/nm$^2$/km to +0.009 ps/nm$^2$/km, and a fourth-order dispersion of $-1.8 \times 10^{-4}$ ps/nm$^3$/km to $+1.8 \times 10^{-4}$ ps/nm$^3$/km. More preferably, the dispersion slope falls within the range of −0.007 ps/nm$^2$/km to +0.007 ps/nm$^2$/km, and the fourth-order dispersion falls within a range of $-1.1 \times 10^{-4}$ ps/nm$^3$/km to $+1.1 \times 10^{-4}$ ps/nm$^3$/km.

The optical fiber according to the present invention preferably has, as characteristics with respect to light of a wavelength of 1550 nm, an effective area of 30 μm$^2$ or less, and a mode field diameter of 6.5 μm or less. When $\lambda 2$ and $\lambda 3$ ($\lambda 2 < \lambda 3$) are defined as two wavelengths each of which is in a wavelength range of 1400 nm to 2000 nm and a difference between which is 150 nm or more, a variation of the chromatic dispersion (variation: numerical range given by maximum−minimum) in an entire wavelength range of λ2 to λ3 is preferably 0.5 ps/nm/km or less. In this case, preferably, the wavelength λ2 is 1600 nm or less and the wavelength λ3 is 1800 nm or more. In the entire wavelength range of λ2 to λ3, the chromatic dispersion preferably falls within a range of −2 ps/nm/km to 0 ps/nm/km. The optical fiber preferably has at least two zero dispersion wavelengths in the wavelength range of 1400 nm to 2000 nm. The optical fiber preferably has a polarization mode dispersion of 0.2 ps/km$^{1/2}$ or less at the wavelength of 1550 nm. When the optical fiber has a length of 100 m or more, a crosstalk between orthogonal polarization modes at the wavelength of 1550 nm is preferably −15 dB or less.

The optical fiber according to the present invention may further comprise a first depressed region between the center core region and the outside cladding region. In this configuration, with reference to the refractive index of the outside cladding region, a relative refractive index difference of the center core region is preferably 1% or more and a relative refractive index difference of the first depressed region is preferably −0.5% or less. The optical fiber may further comprise a ring region having a refractive index higher than those of the first depressed region and the outside cladding region, between the first depressed region and the outside cladding region. The optical fiber may further comprise a second depressed region having a refractive index lower than those of the ring region and the outside cladding region, between the ring region and the outside cladding region. In this configuration, the optical fiber preferably has a fiber cutoff wavelength of 1620 nm. A ratio Ra (=2a/2b) of an outside diameter 2a of the center core region to an outside diameter 2b of the first depressed region preferably falls within a range of 0.6 to 0.75.

An optical device according to the present invention comprises the optical fiber having the structure as described above (the optical fiber according to the present invention), and a light source section for emitting light of a predetermined wavelength into the optical fiber. Particularly, in the optical device, the optical fiber outputs light which has a wavelength different from that of the incident light, and which is newly generated by a nonlinear optical phenomenon or phenomena induced during propagation of the incident light from the light source section. In the optical device according to the present invention, preferably, the light source section outputs light whose center wavelength is a wavelength λ4 in the wavelength range of 1520 nm to 1620 nm, and the optical fiber outputs light having a bandwidth of 200 nm or more. This optical fiber preferably outputs broadband light having an intensity variation of 3 dB or less over an entire wavelength band with a width of 200 nm or more. This optical fiber preferably outputs broadband light having an intensity variation of 20 dB or less over an entire wavelength band with a width of 1 octave or more. Furthermore, in the optical device according to the present invention, preferably, the seed light includes a first portion whose center wavelength is a wavelength λ5 in the wavelength range of 1520 nm to 1620 nm and a second portion whose center wavelength is a wavelength λ6 (λ5≠λ6) in the wavelength range of 1520 nm to 1620 nm, and the optical fiber outputs light of a wavelength different from the wavelengths λ5 and λ6.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 40 is a table of characteristics of samples of the optical fiber according to Embodiment 8;

FIG. 42 is a table of characteristics of samples of the optical fiber according to Embodiment 9;

DETAILED DESCRIPTION OF THE PREFERRED EMBODIMENTS

In the following, embodiments of an optical fiber according to the present invention and an optical device using the optical fiber will be explained in detail using FIGS. 1 to 45. In the description of the drawings the same elements will be denoted by the same reference symbols, without redundant description.

Figure 1:
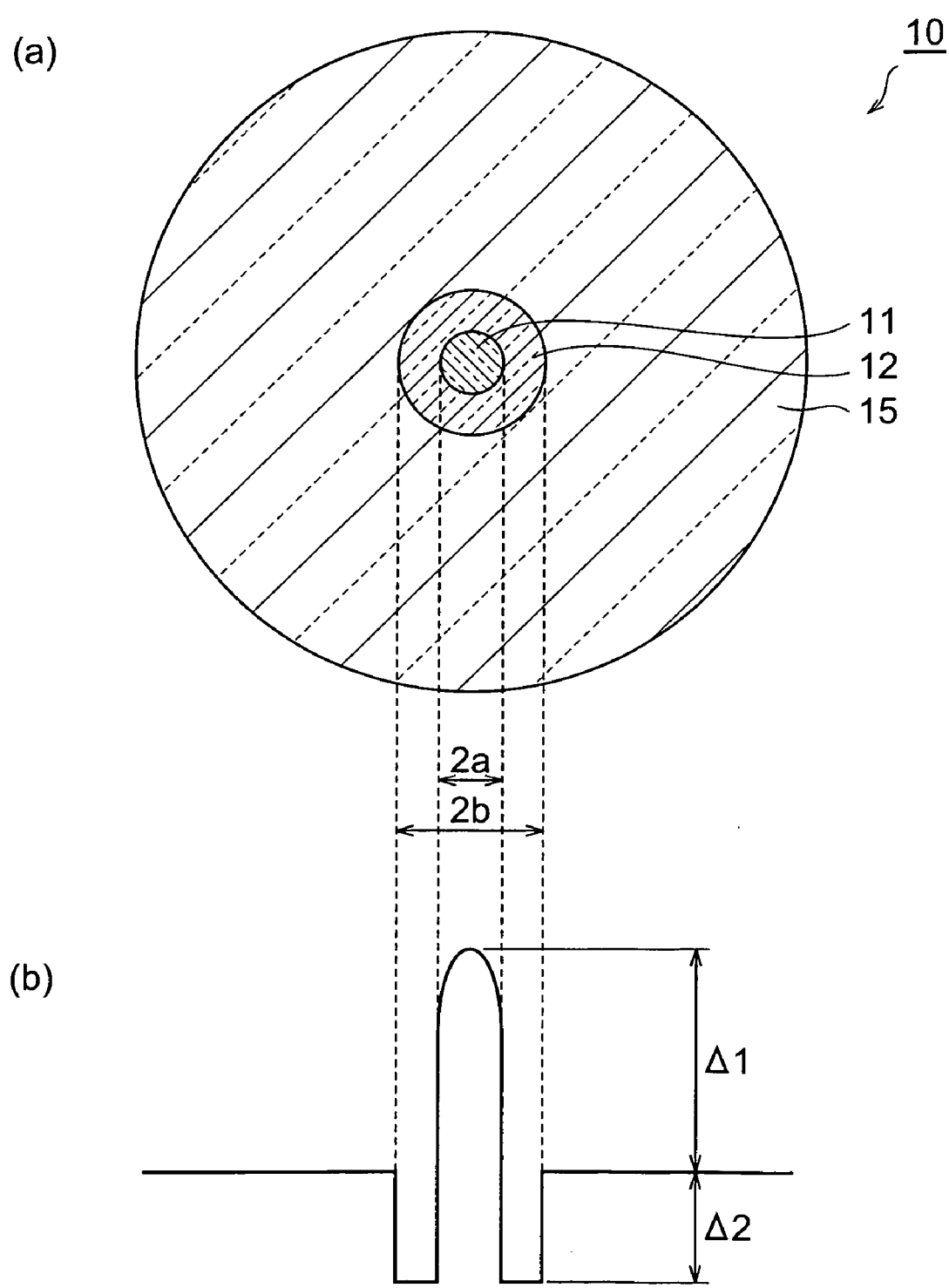
FIG. 1 is a drawing showing a sectional structure and refractive index profile, as a first structure of an optical fiber according to the present invention.
Figure 2:
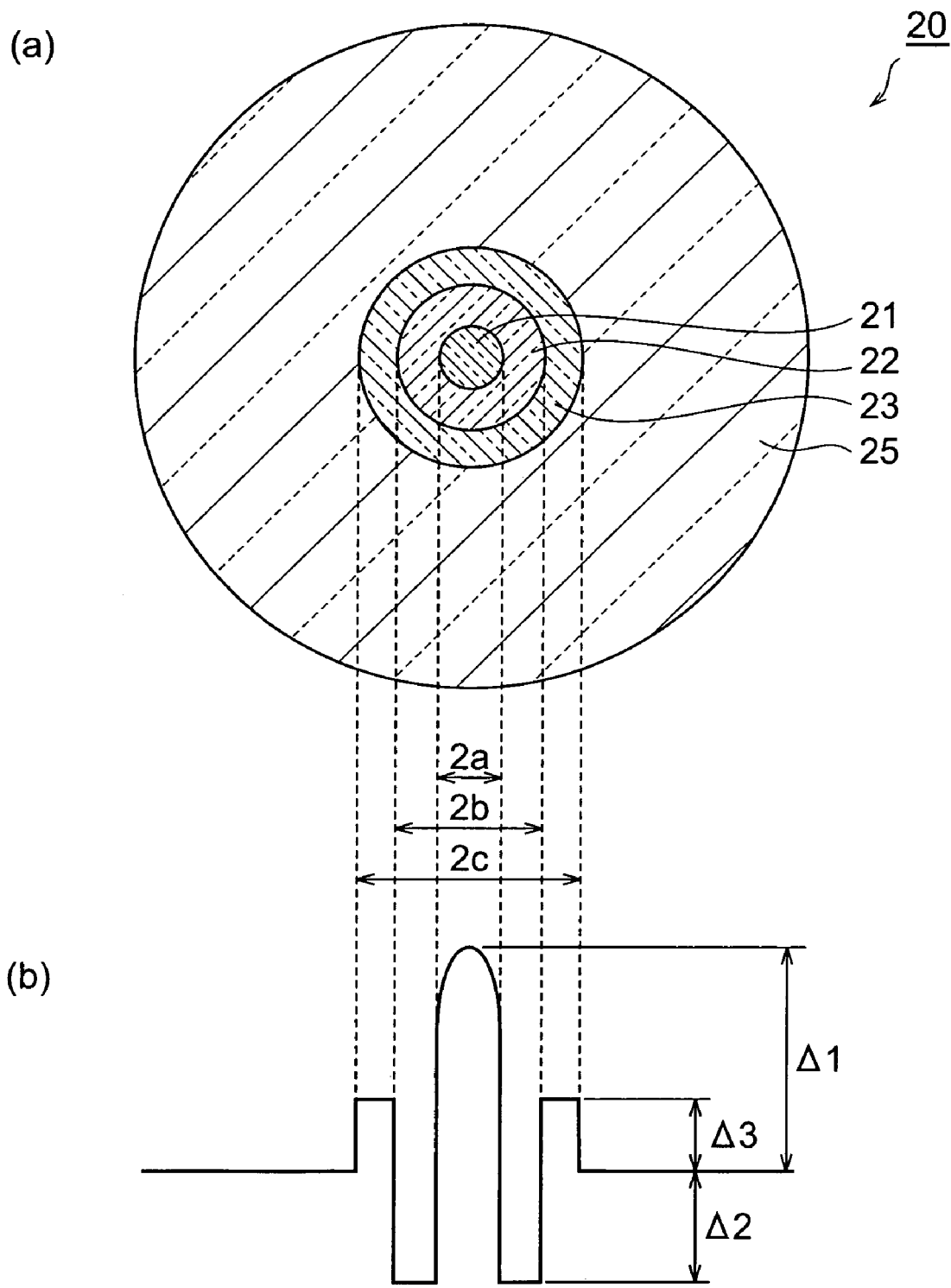
FIG. 2 is a drawing showing a sectional structure and refractive index profile, as a second structure of an optical fiber according to the present invention.
Figure 3:
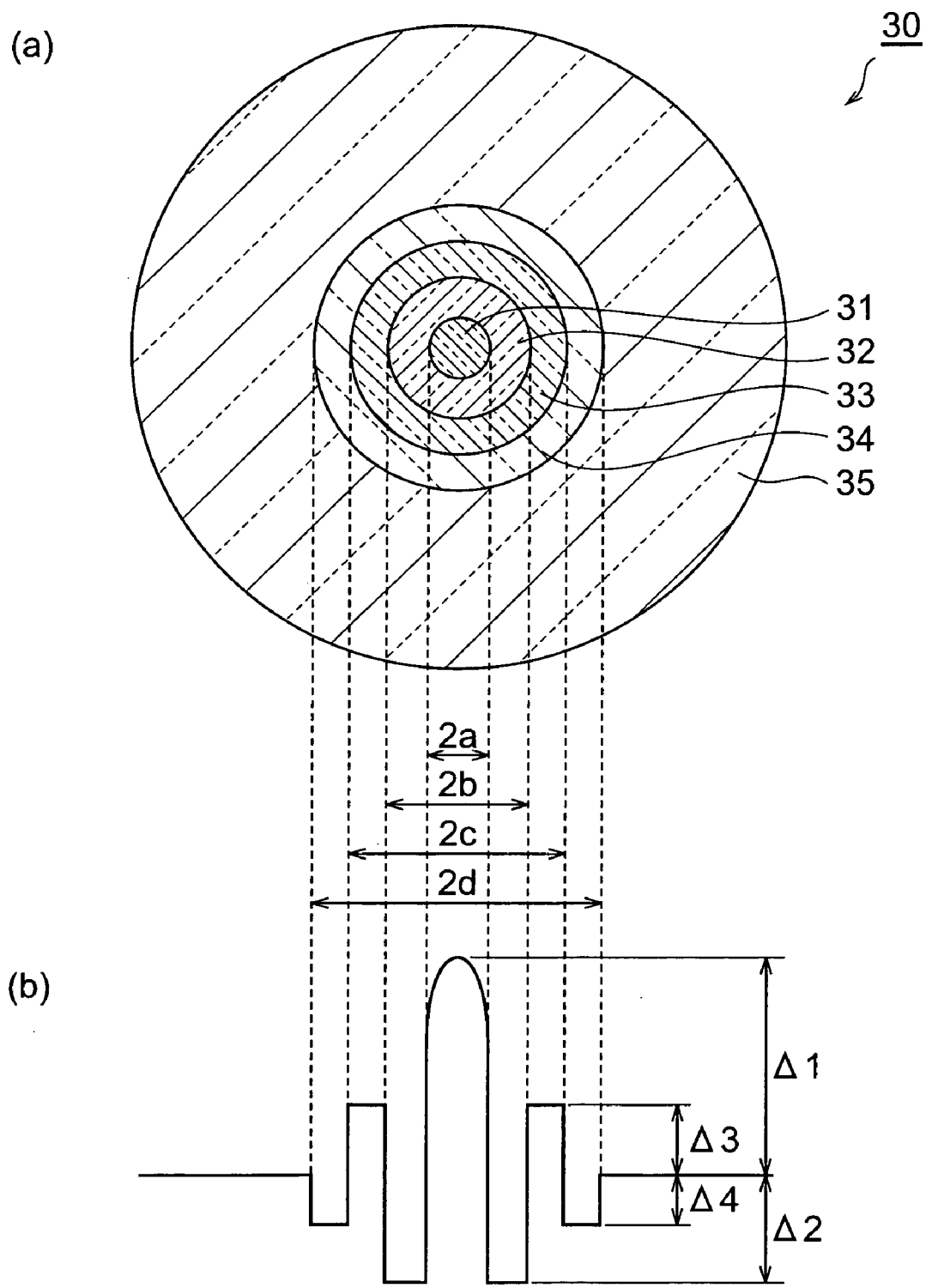
FIG. 3 is a drawing showing a sectional structure and refractive index profile, as a third structure of an optical fiber according to the present invention.

First, various structures of optical fibers according to the present invention will be explained. FIG. 1 is a drawing showing a sectional structure and refractive index profile, as a first structure of an optical fiber according to the present invention. FIG. 2 is a drawing showing a sectional structure and refractive index profile, as a second structure of an optical fiber according to the present invention. FIG. 3 is a drawing showing a sectional structure and refractive index profile, as a third structure of an optical fiber according to the present invention. The area (a) in each of these FIGS. 1 to 3 shows the sectional structure of the optical fiber having one of the first to third structures, and each area (b) shows the refractive index profile thereof.

The optical fiber 10 shown in FIG. 1 has the first structure which comprises at least a center core region 11, and an outside cladding region 15 having a refractive index lower than that of the center core region 11 and provided on an outer periphery of the center core region 11. Furthermore, the optical fiber 10 includes a first depressed region 12 between the center core region 11 and the outside cladding region 15.

The optical fiber 20 shown in FIG. 2 has the second structure which includes a center core region 21, a first depressed region 22 provided on an outer periphery of the center core region 21, a ring region 23 provided on an outer periphery of the first depressed region 22, and an outside cladding region 25 provided on an outer periphery of the ring region 23. As compared with the optical fiber 10 shown in FIG. 1, the optical fiber 20 shown in FIG. 2 is different in that the ring region 23 having a refractive index higher than those of the first depressed region 22 and the outside cladding region 25 is located between the first depressed region 22 and the outside cladding region 25.

Furthermore, the optical fiber 30 shown in FIG. 3 has the third structure which includes a center core region 31, a first depressed region 32 provided on an outer periphery of the center core region 31, a ring region 33 provided on an outer periphery of the first depressed region 32, a second depressed region 34 provided on an outer periphery of the ring region 33, and an outside cladding region 35 provided on an outer periphery of the second depressed region 34. As compared with the optical fiber 20 shown in FIG. 2, the optical fiber 30 shown in FIG. 3 is different in that the second depressed region 34 having a refractive index lower than those of the ring region 33 and the outside cladding region 35 is located between the ring region 33 and the outside cladding region 35. Each fiber cutoff wavelength of these optical fibers 10, 20, and 30 is preferably 1620 nm or less.

The optical fibers having the first to third structures shown in FIGS. 1 to 3 are substantialized by silica-based optical fibers mainly composed of silica glass, for example, in which each of the center core region and the ring region is doped with an appropriate amount of $GeO_2$ and in which the first depressed region is doped with an appropriate amount of element F.

As shown in each area (b) of FIGS. 1 to 3, let us define $2a$ as an outside diameter of the center core region, $2b$ as an outside diameter of the first depressed region, $2c$ as an outside diameter of the ring region, and $2d$ as an outside diameter of the second depressed region. With reference to the refractive index of the outside cladding region, a relative refractive index difference of the center core region is defined as $\Delta 1$, that of the first depressed region as $\Delta 2$, that of the ring region as $\Delta 3$, and that of the second depressed region as $\Delta 4$. Under this definition, preferably, the relative refractive index difference of the center core region is 1% or more, and the relative refractive index difference of the first depressed region is −0.5% or less. Such an optical fiber can have a wide wavelength band where the chromatic dispersion is flat.

Figure 4:
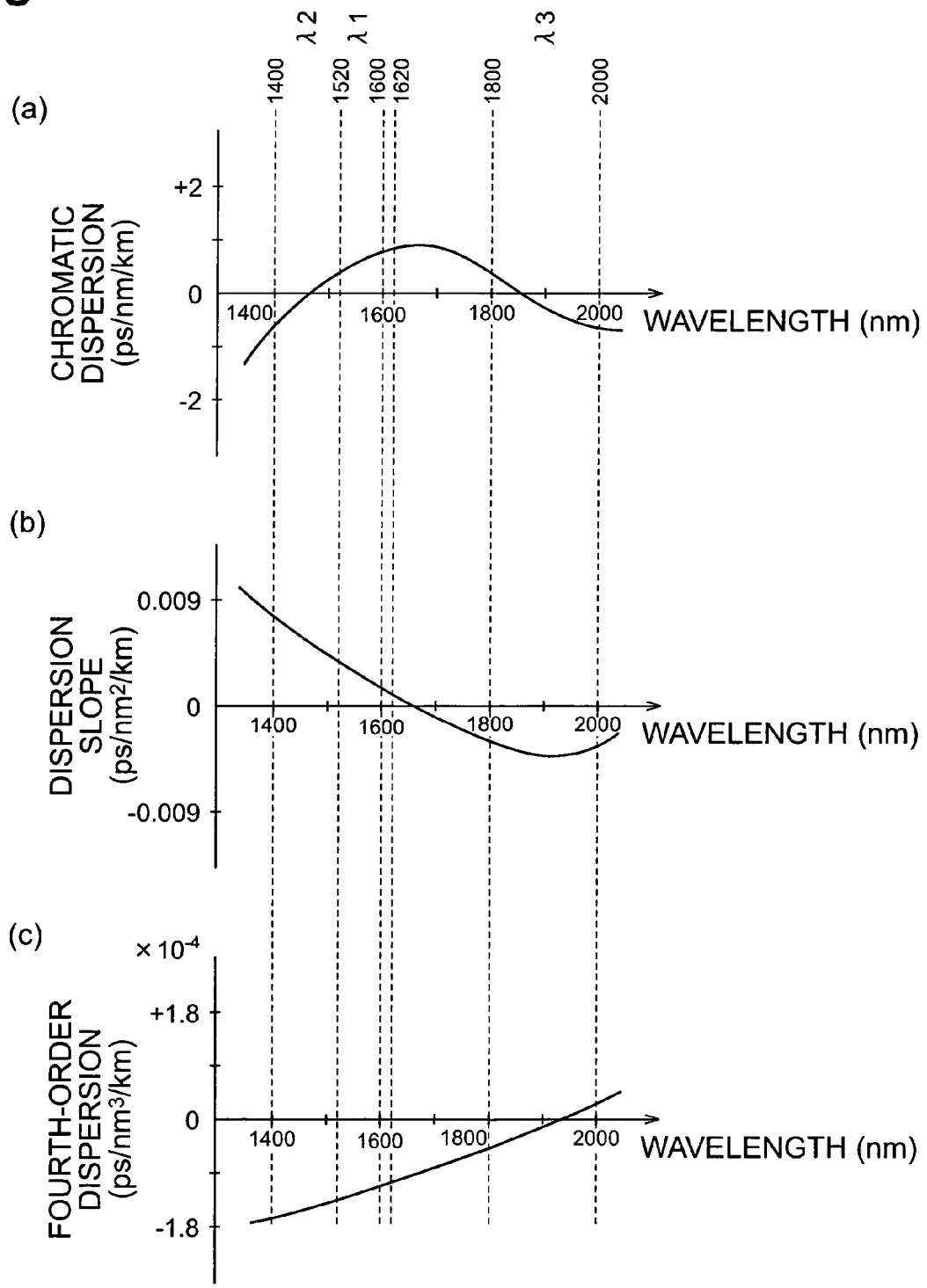
FIG. 4 is a graph showing chromatic dispersion and other characteristics of an optical fiber according to the present invention.

FIG. 4 is a graph showing the chromatic dispersion and other characteristics in an optical fiber according to the present invention. In this FIG. 4, the area (a) shows wavelength dependence of chromatic dispersion, the area (b) shows wavelength dependence of dispersion slope, and the area (c) shows wavelength dependence of fourth-order dispersion. The dispersion slope is obtained by differentiating the chromatic dispersion with respect to wavelength, and the fourth-order dispersion is obtained by differentiating the dispersion slope with respect to wavelength.

The optical fiber according to the present invention preferably has any one of the first to third structures shown in FIGS. 1 to 3. Furthermore, the optical fiber according to the present invention has, as characteristics with respect to light of a wavelength $\lambda 1$ in a wavelength range of 1520 nm to 1620 nm, a chromatic dispersion of −2 ps/nm/km to +2 ps/nm/km, a dispersion slope of −0.009 ps/nm²/km to +0.009 ps/nm²/km, and a fourth-order dispersion of $-1.8 \times 10^{-4}$ ps/nm³/km to $+1.8 \times 10^{-4}$ ps/nm³/km. The optical fiber according to the present invention may have, as characteristics with respect to light of the wavelength of 1550 nm, an effective area of 30 μm² or less, and a mode field diameter of 6.5 μm or less.

In the optical fiber according to the present invention, the chromatic dispersion can be flattened over a wider wavelength band. In particular, since the wavelength band with a small chromatic dispersion is included in a gain band of an optical amplifier with an Er-doped optical fiber applied as an optical amplifying medium (EDFA), it is easier to inject a high-power laser as pumping light. Preferably, the optical fiber has, as characteristics with respect to light of the wavelength $\lambda 1$, the chromatic dispersion falls within a range of −1 ps/nm/km to +1 ps/nm/km, the dispersion slope falls within a range of −0.007 ps/nm²/km to +0.007 ps/nm²/km, and the fourth-order dispersion falls within a range of $-1.1 \times 10^{-4}$ ps/nm³/km to $+1.1 \times 10^{-4}$ ps/nm³/km, whereby the optical fiber has a wider bandwidth where the chromatic dispersion is flattened. More preferably, the optical fiber has, as a characteristic in the entire wavelength range of 1520 nm to 1620 nm, the fourth-order dispersion falls within the range of $-1.1 \times 10^{-4}$ ps/nm³/km to $+1.1 \times 10^{-4}$ ps/nm³/km, whereby the optical fiber has a wider band where the chromatic dispersion is flattened.

In the optical fiber according to the present invention, when $\lambda 2$ and $\lambda 3$ ($\lambda 2 < \lambda 3$) are defined as two wavelengths each of which is in a wavelength range of 1400 nm to 2000 nm and a difference between which is 150 nm or more, a variation of chromatic dispersion (variation: numerical range given by maximum−minimum) is preferably 0.5 ps/nm/km or less over the entire range of the wavelength $\lambda 2$ to the wavelength $\lambda 3$. In this case, the chromatic dispersion is flattened in the wide wavelength range and thus one can expect exhibition of the nonlinear optical phenomenon in a wider band. For example, it becomes feasible to achieve the wavelength conversion of a wide band. The difference "$\lambda 3 - \lambda 2$" is preferably 200 nm or more, and more preferably 300 nm or more.

In the optical fiber according to the present invention, preferably, the wavelength $\lambda 2$ is 1600 nm or less and the wavelength $\lambda 3$ is 1800 nm or more. In this case, since absorption due to water is small in the wavelength range of 1600 nm to 1800 nm, generated SC light in the optical fiber is applicable to sensors for substances containing a large amount of water (living bodies, plants, and the like).

In the optical fiber according to the present invention, preferably, the chromatic dispersion falls within a range of −2 ps/nm/km to 0 ps/nm/km over the entire range of the wavelength $\lambda 2$ to the wavelength $\lambda 3$. In this case, the optical fiber has negative chromatic dispersion (normal dispersion), and thus we can expect generation of high-quality SC light.

The optical fiber according to the present invention preferably has at least two zero dispersion wavelengths in the wavelength range of 1400 nm to 2000 nm. With this design, the chromatic dispersion can be made small over a wider band and wavelength conversion can be carried out over a very wide band near the zero dispersion wavelengths.

The optical fiber according to the present invention preferably has a polarization mode dispersion of 0.2 ps/km$^{1/2}$ or less at the wavelength of 1550 nm. Since such optical fiber has low polarization mode dispersion, the nonlinear optical phenomena such as the SC light generation and the wavelength conversion can be stably generated and the quality is stable over a long term.

When the optical fiber according to the present invention has the length of 100 m or more, a crosstalk between orthogonal polarization modes at the wavelength of 1550 nm is preferably −15 dB or less. In this case, particularly, coupling is suppressed between orthogonal polarization modes, whereby the nonlinear optical phenomena can be generated with extremely stable.

Figure 5:
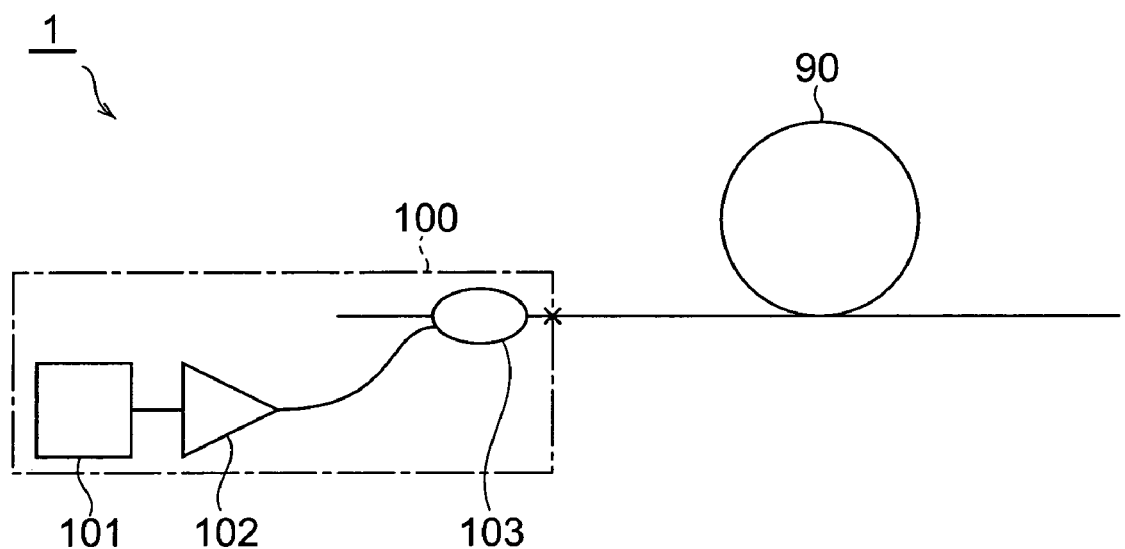
FIG. 5 is a drawing showing a first configuration of an optical device according to the present invention.
Figure 6:
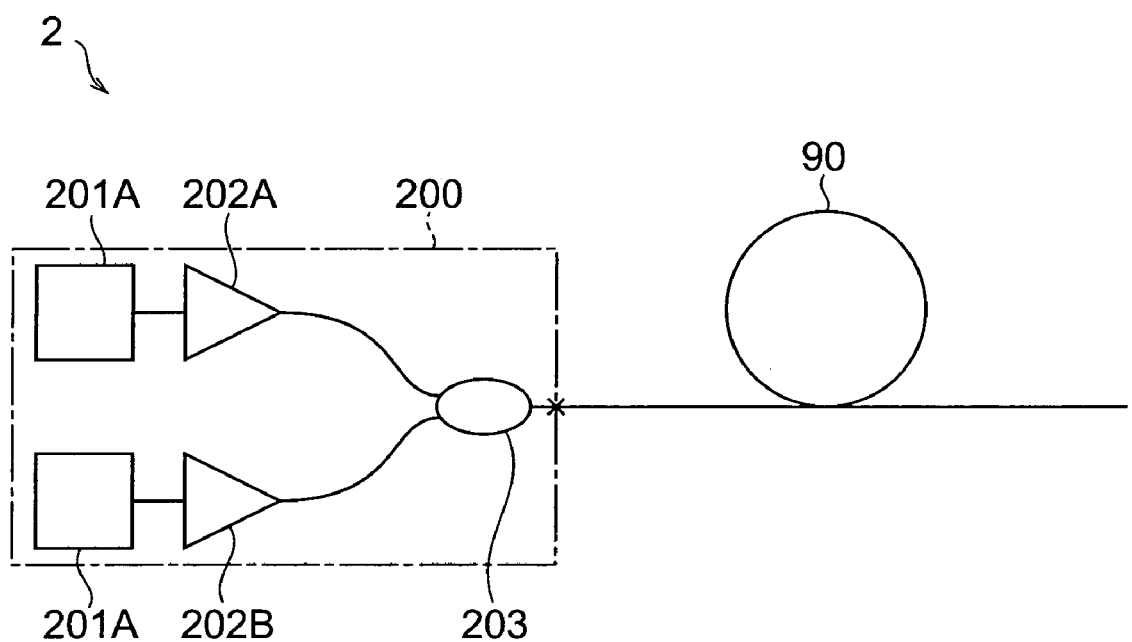
FIG. 6 is a drawing showing a second configuration of an optical device according to the present invention.

Next, various configurations of optical devices according to the present invention will be explained below. FIG. 5 is a drawing showing a first configuration of an optical device according to the present invention, and FIG. 6 a drawing showing a second configuration of an optical device according to the present invention. The optical fiber 90 shown in each of FIGS. 5 and 6 is one of the optical fibers having the first to third structures (the optical fiber according to the present invention).

In the first configuration of the optical device according to the present invention, the optical device 1 shown in FIG. 5 has the optical fiber 90 and light source section 100 as the first configuration. The light source section 100 includes a light source 101, an optical amplifier 102, and an optical coupler 103. Light emitted from the light source 101 is amplified by the optical amplifier 102 and then guided via the optical coupler 103 into the optical fiber 90. During propagation of the incident light through the optical fiber 90, a nonlinear optical phenomenon or phenomena are induced in the optical fiber 90. The nonlinear optical phenomenon or phenomena produce new light of a wavelength different from that of the incident light, and this light of the different wavelength is emitted from an end face of the optical fiber 90.

Preferably, the light source section 100 outputs light a center wavelength of which is a wavelength λ4 in a wavelength range of 1520 nm to 1620 nm, and the optical fiber 90 into which the light of the wavelength λ4 is incident, outputs light having a bandwidth of 200 nm or more. In this case, a high-quality broadband light source is obtained.

The optical fiber 90 preferably outputs broadband light having an intensity variation of 3 dB or less over an entire band with a width of 200 nm or more. In this case, a high-quality broadband light source is obtained and it can be applied to a multi-channel light source for optical communication through slicing of arbitrary wavelengths.

The optical fiber 90 preferably outputs broadband light having an intensity variation of 20 dB or less over an entire band with a width of 1 octave or more. In this case, a broadband light source with an extremely wide band is obtained, and it becomes feasible to fabricate such as absolute frequency measurement and frequency stabilization light sources.

In the second configuration of the optical device according to the present invention, the optical device 2 shown in FIG. 6 has the optical fiber 90 and light source section 200. The light source section 200 includes light sources 201A, 201B, optical amplifiers 202A, 202B, and an optical coupler 203. Light with the center wavelength of the wavelength λ5 outputted from the light source 201A is amplified by the optical amplifier 202A. On the other hand, light with the center wavelength of the wavelength λ6 outputted from the light source 201B is amplified by the optical amplifier 202B. These lights with the two wavelengths are multiplexed by the optical coupler 203 and the multiplexed lights are incident into the optical fiber 90. During propagation of the incident multiplexed lights including the two wavelength components through the optical fiber 90, a nonlinear optical phenomenon or phenomena (e.g., four-wave mixing) is induced in the optical fiber 90. This nonlinear optical phenomenon newly generates light of a wavelength different from those of the incident multiplexed lights, and the light of the different wavelength is outputted from the end face of the optical fiber 90.

Next, embodiments of optical fibers according to the present invention will be explained below together with a comparative example. Ra will represent a ratio ($2a/2b$) of the outside diameter $2a$ of the center core region to the outside diameter $2b$ of the first depressed region, Rb will represent a ratio ($2b/2c$) of the outside diameter $2b$ of the first depressed region to the outside diameter $2c$ of the ring region, and Rc will represent a ratio ($2c/2d$) of the outside diameter $2c$ of the ring region to the outside diameter $2d$ of the second depressed region.

COMPARATIVE EXAMPLE

Figure 7:
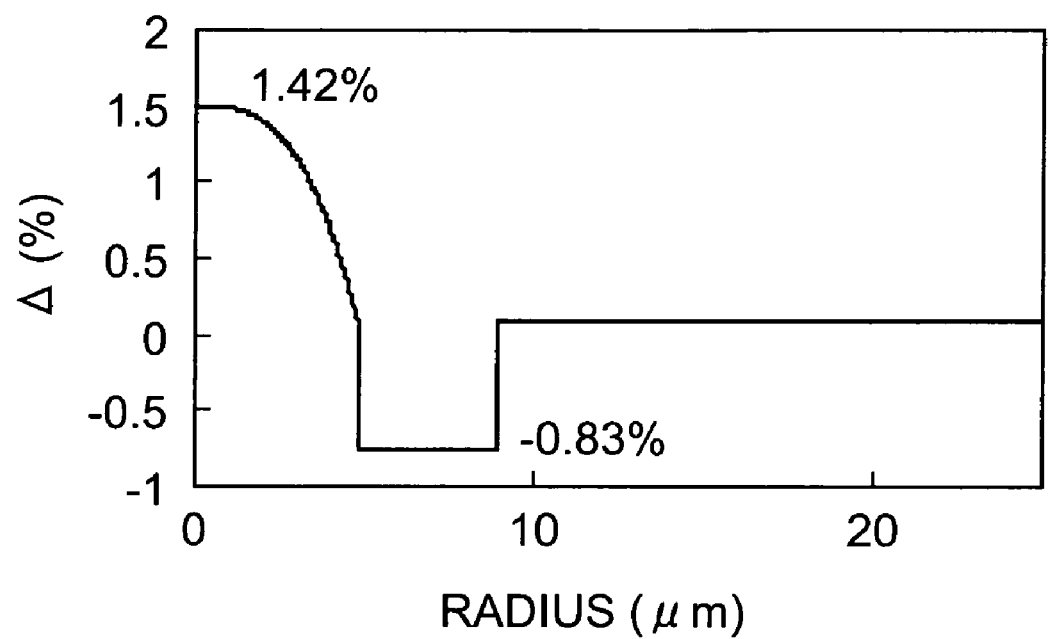
FIG. 7 is a refractive index profile of an optical fiber as a comparative example.
Figure 8:
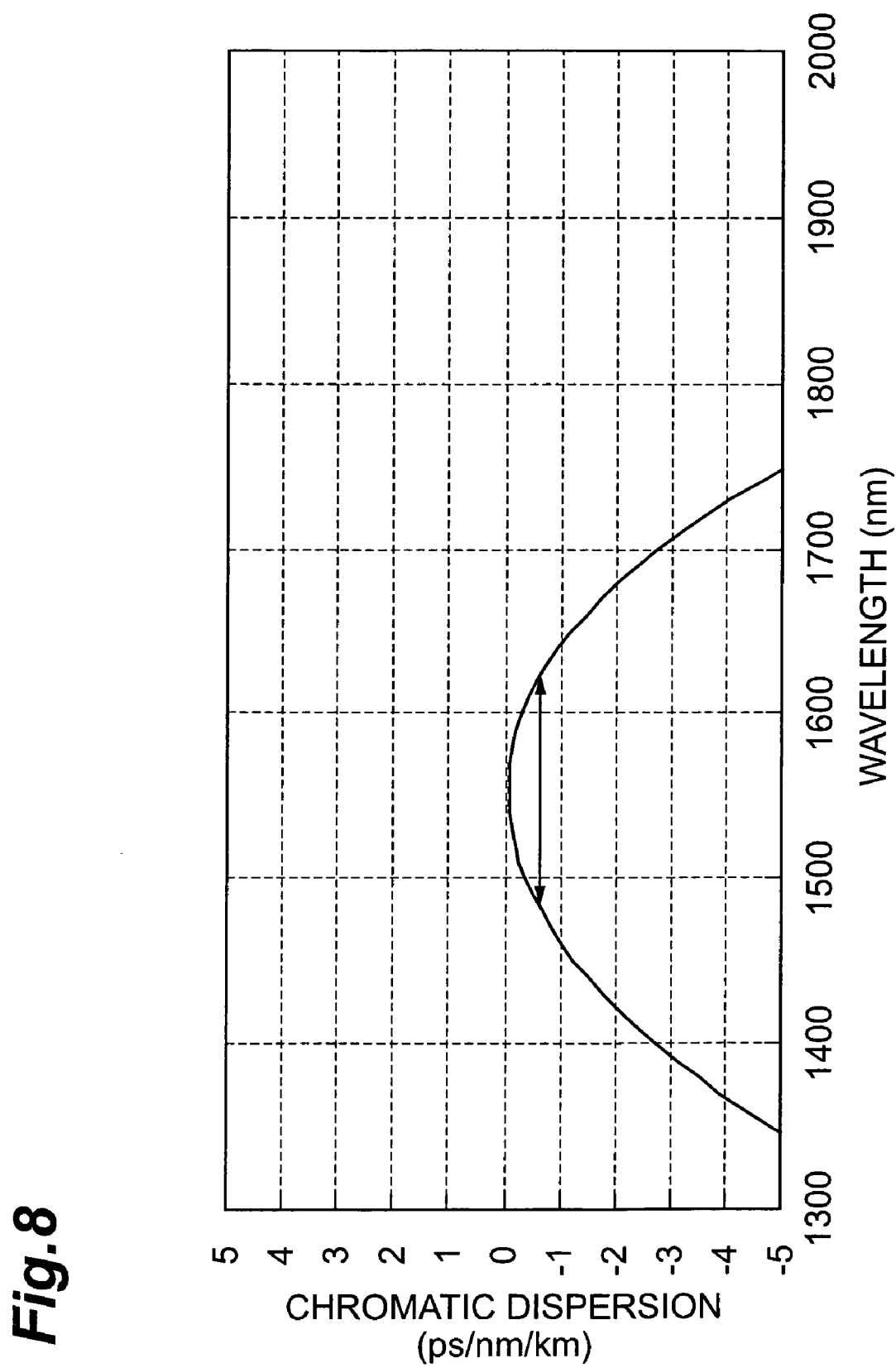
FIG. 8 is a graph showing wavelength dependence of chromatic dispersion in the optical fiber according to the comparative example.
Figure 9:
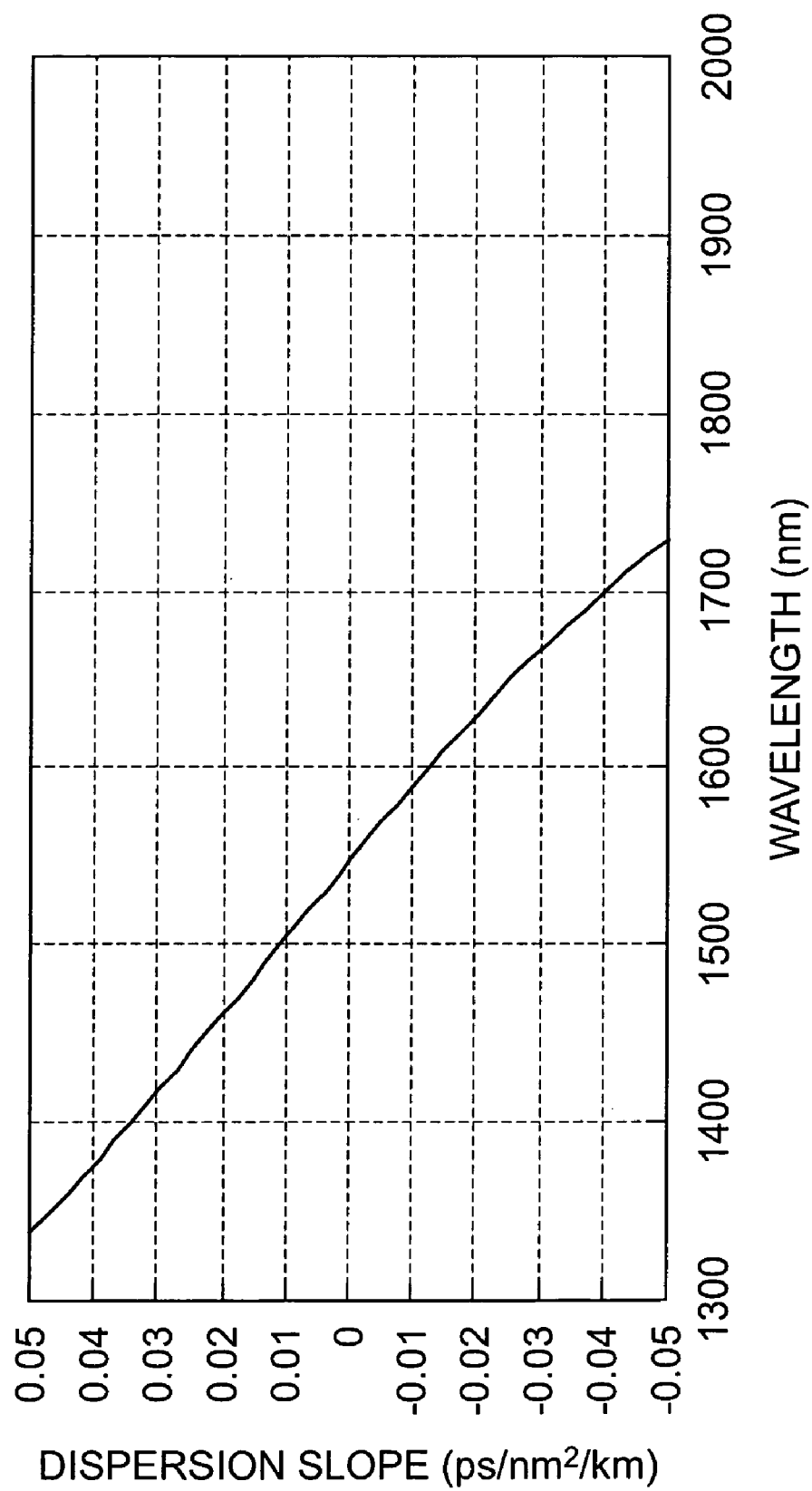
FIG. 9 is a graph showing wavelength dependence of dispersion slope in the optical fiber according to the comparative example.
Figure 10:
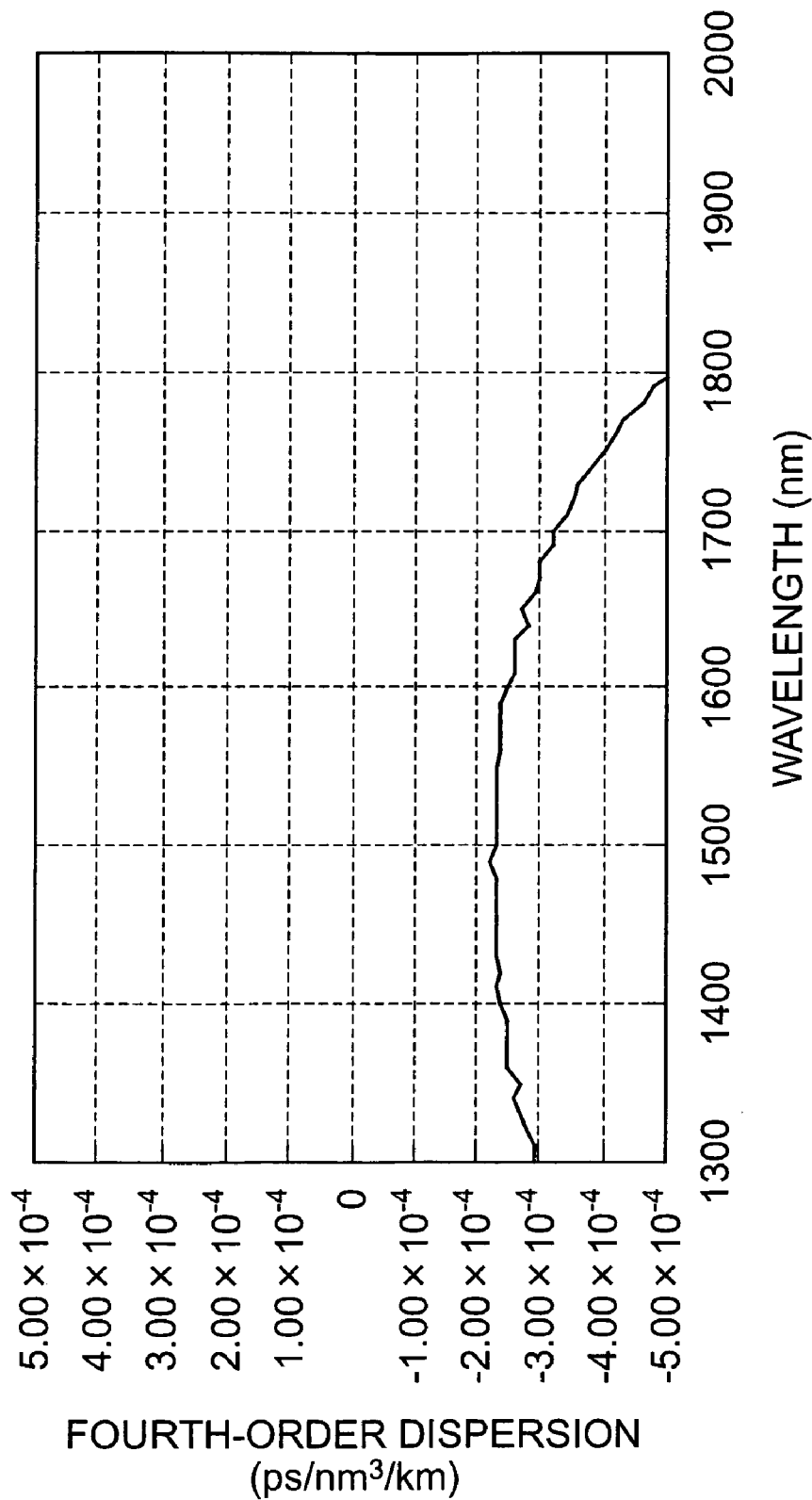
FIG. 10 is a graph showing wavelength dependence of fourth-order dispersion in the optical fiber according to the comparative example.

The optical fiber according to the comparative example has the first structure shown in FIG. 1. FIG. 7 is a refractive index profile of the optical fiber according to the comparative example (showing the refractive indices of the respective portions along the radial direction). FIG. 8 is a graph showing the wavelength dependence of chromatic dispersion in the optical fiber according to the comparative example. FIG. 9 is a graph showing the wavelength dependence of dispersion slope in the optical fiber according to the comparative example. FIG. 10 is a graph showing the wavelength dependence of fourth-order dispersion in the optical fiber according to the comparative example.

In the optical fiber according to the comparative example, as shown in FIG. 7, the relative refractive index difference $\Delta 1$ of the center core region with respect to the outside cladding region is 1.42%, and the relative refractive index difference $\Delta 2$ of the first depressed region with respect to the outside cladding region is −0.83%. The ratio Ra (=$2a/2b$) is 0.55 and the radius a of the center core region is 4.88 μm.

The optical fiber according to the comparative example is constructed without consideration to the fourth-order dispersion. Therefore, the wavelength band where the chromatic dispersion is flattened is narrow. In particular, as shown in FIG. 8, the wavelength band where the chromatic dispersion is flattened, i.e., the wavelength band where the chromatic dispersion falls within the range of ±0.25 ps/nm/km centered around −0.25 ps/nm/km is as narrow as about 1490 nm-1620 nm (bandwidth 130 nm). This narrow dispersion-flattened band in the comparative example results from the fact that the absolute value of the fourth-order dispersion is large, the fourth-order dispersion being $-2 \times 10^{-4}$ ps/nm$^3$/km, in the wavelength range of 1520 nm to 1620 nm, as can be seen from FIG. 10, while the dispersion slope is approximately 0 ps/nm$^2$/km at the wavelength of 1550 nm, as shown in FIG. 9.

The optical fiber according to the comparative example has the following parameters as characteristics at the wavelength of 1550 nm. Namely, the effective area $A_{eff}$ is 15.8 μm$^2$. The mode field diameter is 4.5 μm. The nonlinear coefficient is 11 (1/W/km). The transmission loss is 0.37 dB/km. And, the fiber cutoff wavelength is 980 nm. The polarization mode dispersion is 0.02 ps/km$^{1/2}$. The nonlinear coefficient is a value derived by XPM method, as defined by "$N_2/A_{eff} \times 2\pi/\lambda$," and the nonlinear coefficient by CW-SPM is approximately 70% smaller. $N_2$ is a nonlinear refractive index.

Embodiment 1

Figure 11:
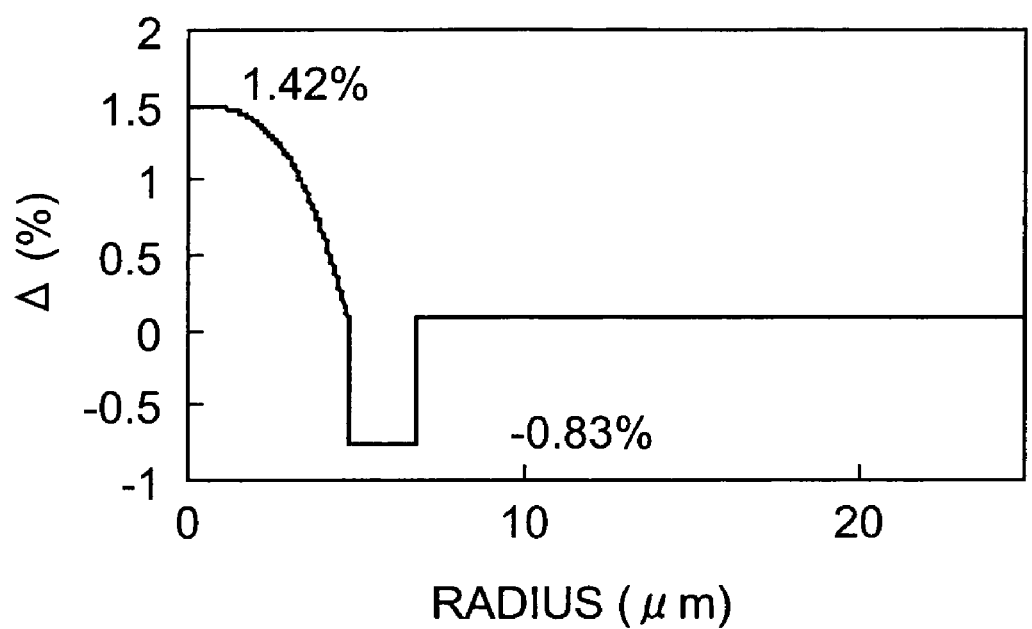
FIG. 11 is a refractive index profile of an optical fiber according to Embodiment 1.
Figure 12:
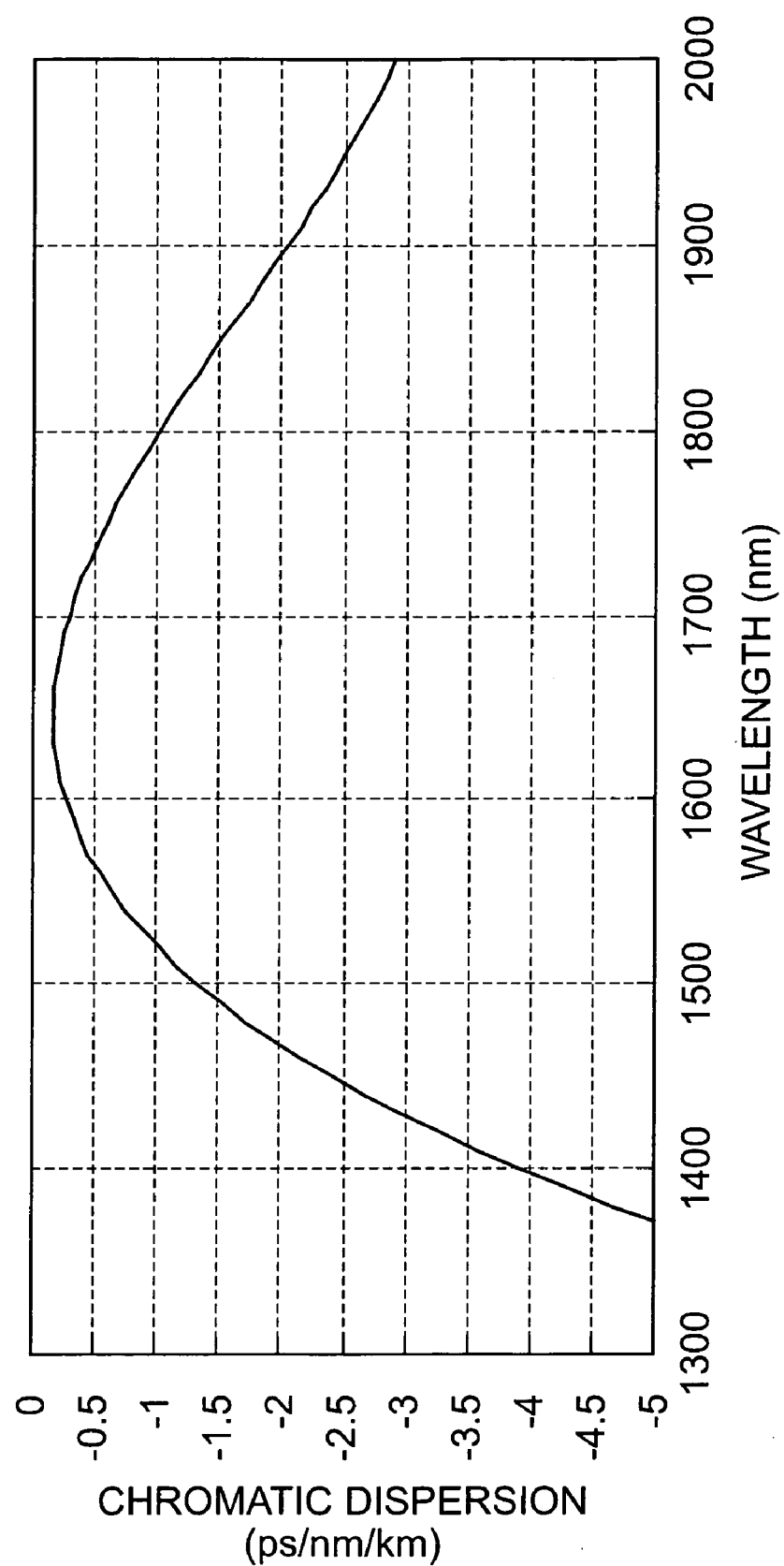
FIG. 12 is a graph showing wavelength dependence of chromatic dispersion in the optical fiber according to Embodiment 1.
Figure 13:
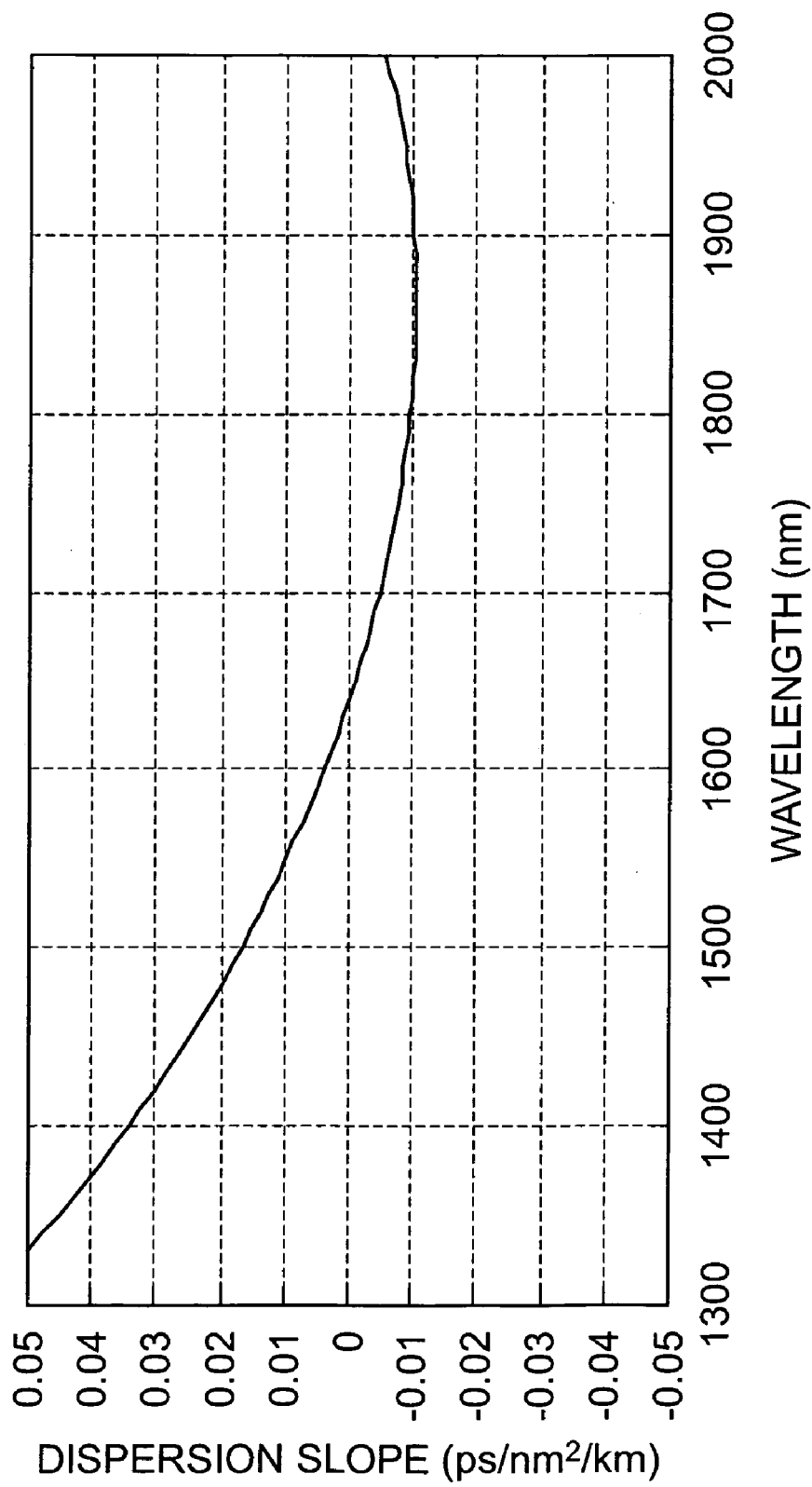
FIG. 13 is a graph showing wavelength dependence of dispersion slope in the optical fiber according to Embodiment 1.
Figure 14:
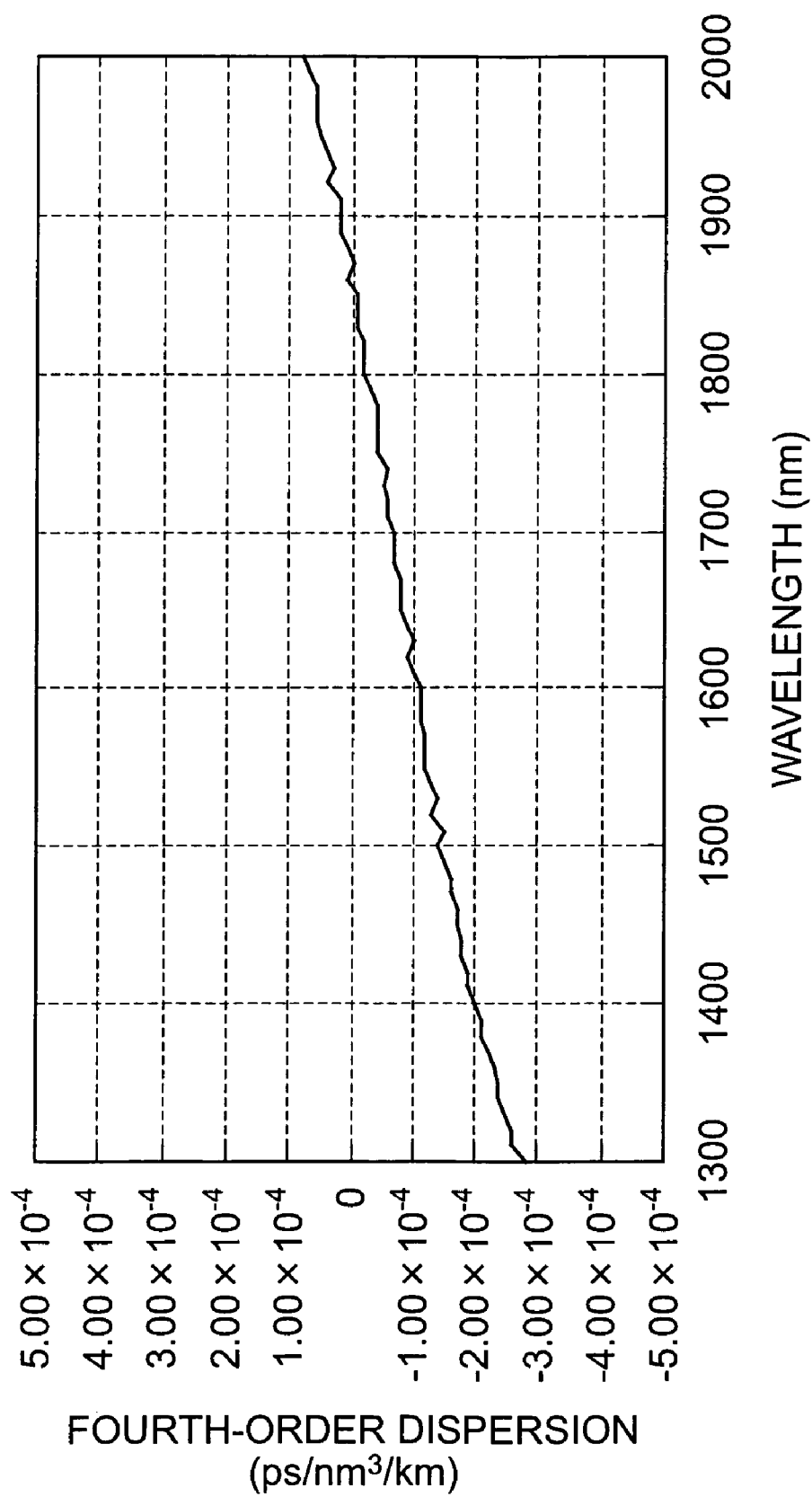
FIG. 14 is a graph showing wavelength dependence of fourth-order dispersion in the optical fiber according to Embodiment 1.

The optical fiber according to Embodimente 1 has the first structure shown in FIG. 1. FIG. 11 is a refractive index profile of the optical fiber according to Embodiment 1 (showing the refractive indices of the respective portions along the radial direction). FIG. 12 is a graph showing the wavelength dependence of chromatic dispersion in the optical fiber according to Embodiment 1. FIG. 13 is a graph showing the wavelength dependence of dispersion slope in the optical fiber according to Embodiment 1. FIG. 14 is a graph showing the wavelength dependence of fourth-order dispersion in the optical fiber according to Embodiment 1.

In the optical fiber according to Embodiment 1, as shown in FIG. 11, the relative refractive index difference $\Delta 1$ of the center core region with respect to the outside cladding region is 1.42%, and the relative refractive index difference $\Delta 2$ of the first depressed region with respect to the outside cladding region is −0.83%. The ratio Ra (=$2a/2b$) is 0.71. The radius a of the center core region is 4.88 μm.

When the radial width of the first depressed region is kept narrow (the ratio Ra is as large as 0.71) in this manner, the absolute value of the fourth-order dispersion becomes small. In particular, as shown in FIG. 14, the fourth-order dispersion at the wavelength of 1520 nm is $-1.3 \times 10^{-4}$ ps/nm$^3$/km, and the fourth-order dispersion at the wavelength of 1620 nm is $-0.9 \times 10^{-4}$ ps/nm$^3$/km. On the other hand, as can be also seen from FIG. 12, the wavelength band where the chromatic dispersion falls within the range of ±0.25 ps/nm/km centered around −0.33 ps/nm/km is 1550 nm–1760 nm (width: 210 nm), and thus the chromatic-dispersion-flattened band is widened. It is seen that the dispersion slope shown in FIG. 13 has lower wavelength dependence on the longer wavelength side over the wavelength of 1550 nm than that in FIG. 9 of the comparative example.

The optical fiber according to Embodiment 1 has the following parameters as characteristics at the wavelength of 1550 nm. Namely, the effective area $A_{eff}$ is 17.5 $\mu m^2$. The mode field diameter is 4.8 μm. The nonlinear coefficient is 9.8 (1/W/km). The transmission loss is 0.38 dB/km. The fiber cutoff wavelength is 1070 nm. The polarization mode dispersion is 0.02 $ps/km^{1/2}$.

Embodiment 2

Figure 15:
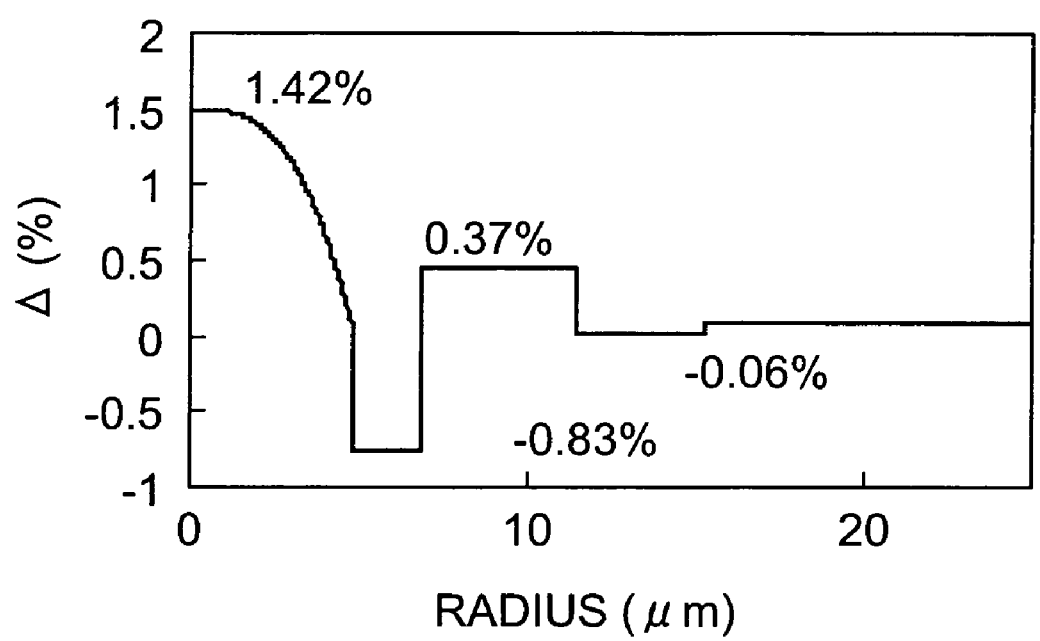
FIG. 15 is a refractive index profile of an optical fiber according to Embodiment 2.
Figure 16:
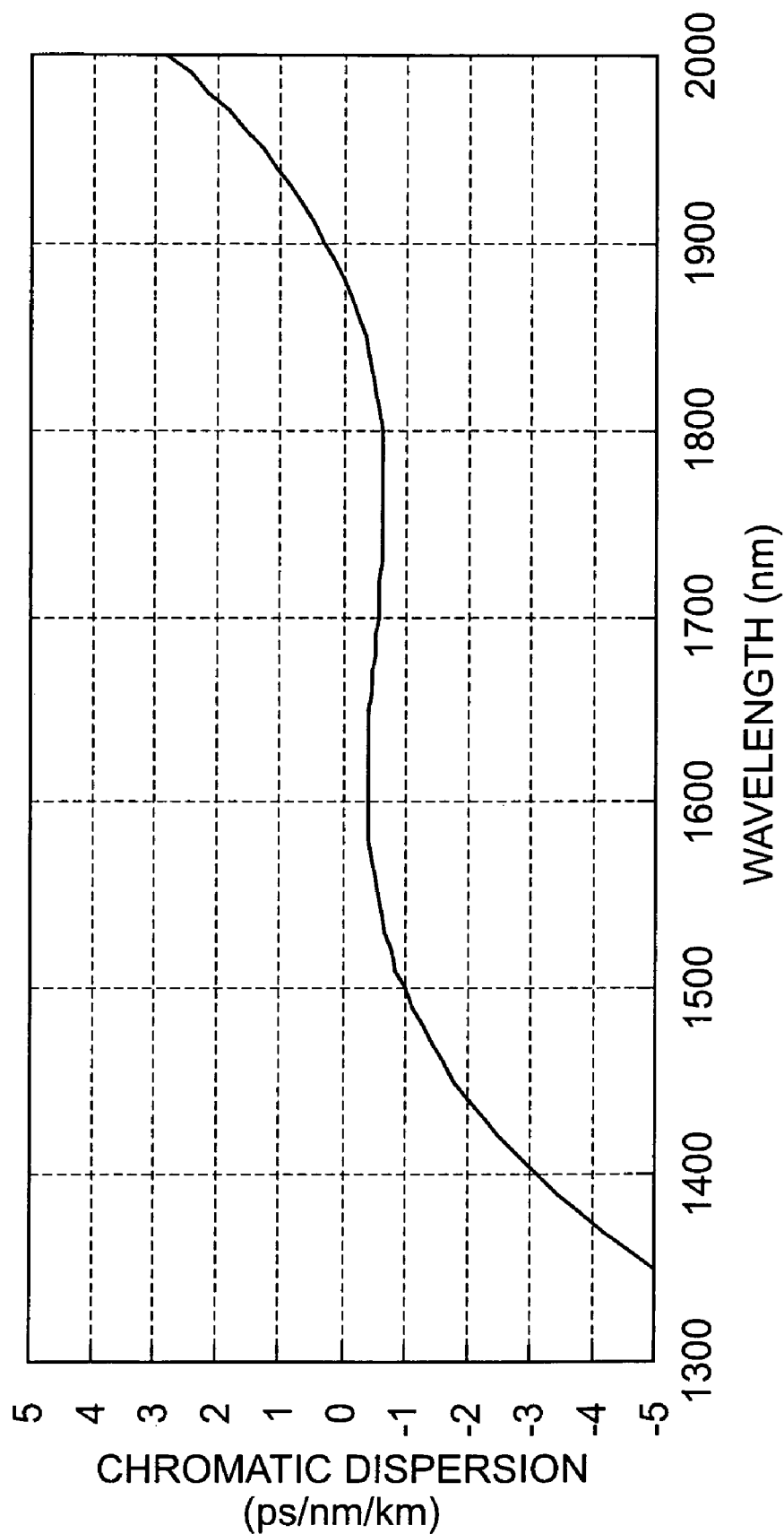
FIG. 16 is a graph showing wavelength dependence of chromatic dispersion in the optical fiber according to Embodiment 2.
Figure 17:
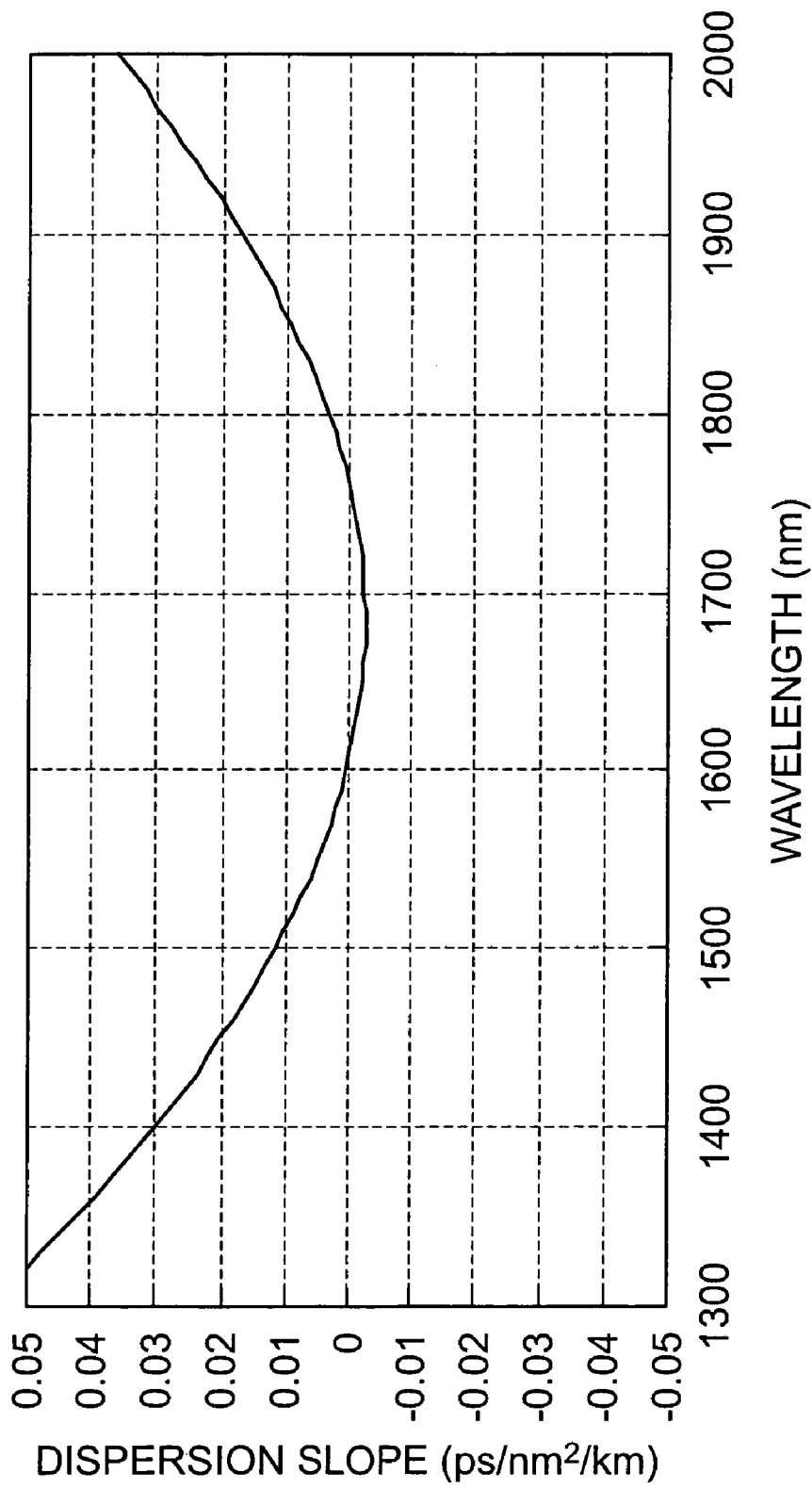
FIG. 17 is a graph showing wavelength dependence of dispersion slope in the optical fiber according to Embodiment 2.
Figure 18:
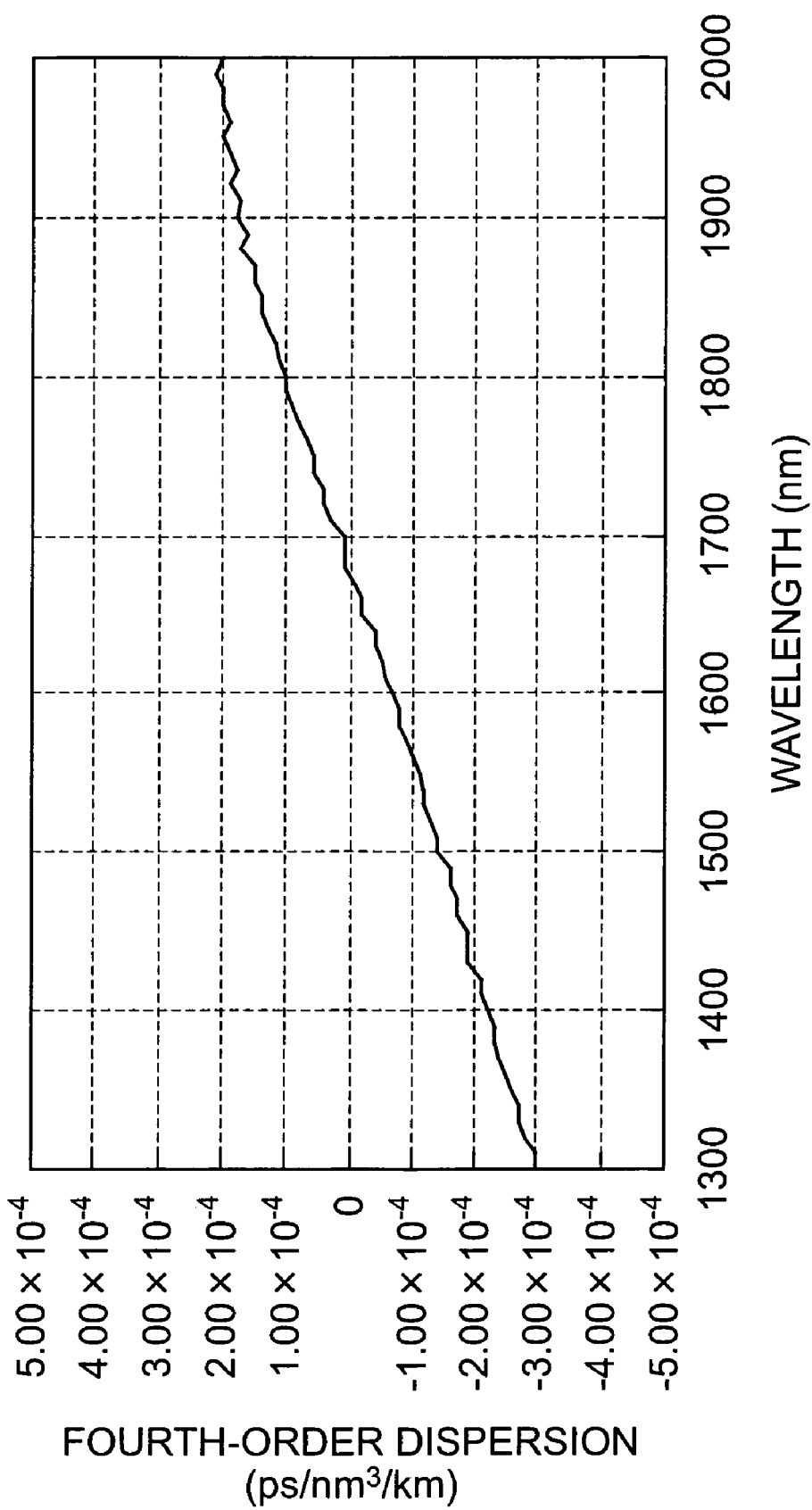
FIG. 18 is a graph showing wavelength dependence of fourth-order dispersion in the optical fiber according to Embodiment 2.

The optical fiber according to Embodiment 2 has the third structure shown in FIG. 3. FIG. 15 is a refractive index profile of the optical fiber according to Embodiment 2 (showing the refractive indices of the respective portions along the radial direction). FIG. 16 is a graph showing the wavelength dependence of chromatic dispersion in the optical fiber according to Embodiment 2. FIG. 17 is a graph showing the wavelength dependence of dispersion slope in the optical fiber according to Embodiment 2. FIG. 18 is a graph showing the wavelength dependence of fourth-order dispersion in the optical fiber according to Embodiment 2.

In this optical fiber according to Embodiment 2, as shown in FIG. 15, the relative refractive index difference $\Delta 1$ of the center core region with respect to the outside cladding region is 1.42%, the relative refractive index difference $\Delta 2$ of the first depressed region with respect to the outside cladding region is −0.83%, the relative refractive index difference $\Delta 3$ of the ring region with respect to the outside cladding region is 0.37%, and the relative refractive index difference $\Delta 4$ of the second depressed region with respect to the outside cladding region is −0.06%. The ratio Ra (=2a/2b) is 0.71, the ratio Rb (=2b/2c) is 0.60, and the ratio Rc (=2c/2d) is 0.75. The radius a of the center core region is 5.74 μm.

By adopting such multiple structure, it becomes feasible to further expand the width of the wavelength band where the chromatic dispersion is flattened. In particular, as can be seen from FIG. 16, the wavelength band where the chromatic dispersion falls within the range of ±0.25 ps/nm/km centered around −0.65 ps/nm/km is 1510 nm–1840 nm (bandwidth 330 nm), and thus the width of the band where the chromatic dispersion is flattened can be further expanded. In the optical fiber according to Embodiment 2, the dispersion slope also has lower wavelength dependence, as shown in FIG. 17, than that in the comparative example. As can be also seen from FIG. 18, the fourth-order dispersion at the wavelength of 1520 nm is $-1.3 \times 10^{-4}$ $ps/nm^3/km$, and the fourth-order dispersion at the wavelength of 1620 nm $-0.5 \times 10^{-4}$ $ps/nm^3/km$. Therefore, the fourth-order dispersion in the optical fiber according to Embodiment 2 also has the extremely small absolute value.

The optical fiber according to Embodiment 2 has the following parameters as characteristics at the wavelength of 1550 nm. Namely, the effective area $A_{eff}$ is 19.3 $\mu m^2$. The mode field diameter is 5.0 μm. The nonlinear coefficient is 9.0 (1/W/km). The transmission loss is 0.41 dB/km. The fiber cutoff wavelength is 1400 nm. The polarization mode dispersion is 0.02 $ps/km^{1/2}$. A splicing loss with a standard single mode fiber is 0.2 dB/Splice or less.

Embodiment 3

Figure 19:
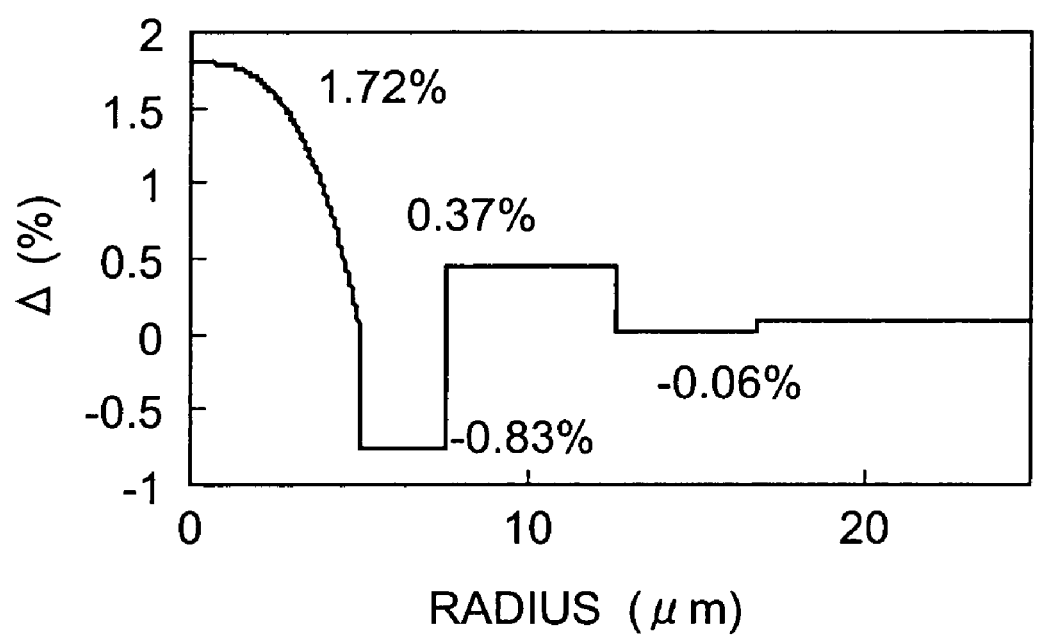
FIG. 19 is a refractive index profile of an optical fiber according to Embodiment 3.
Figure 20:
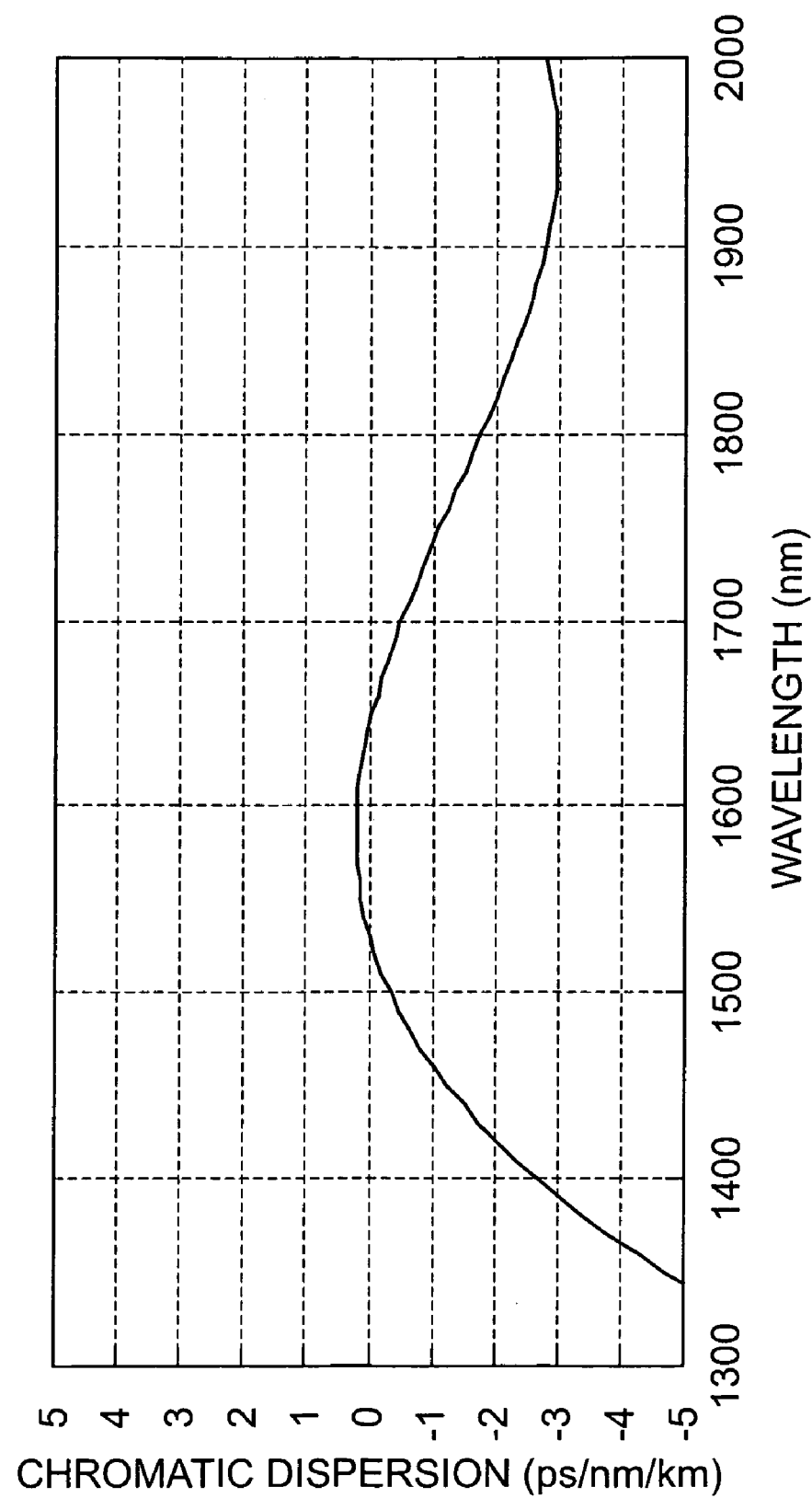
FIG. 20 is a graph showing wavelength dependence of chromatic dispersion in the optical fiber according to Embodiment 3.
Figure 21:
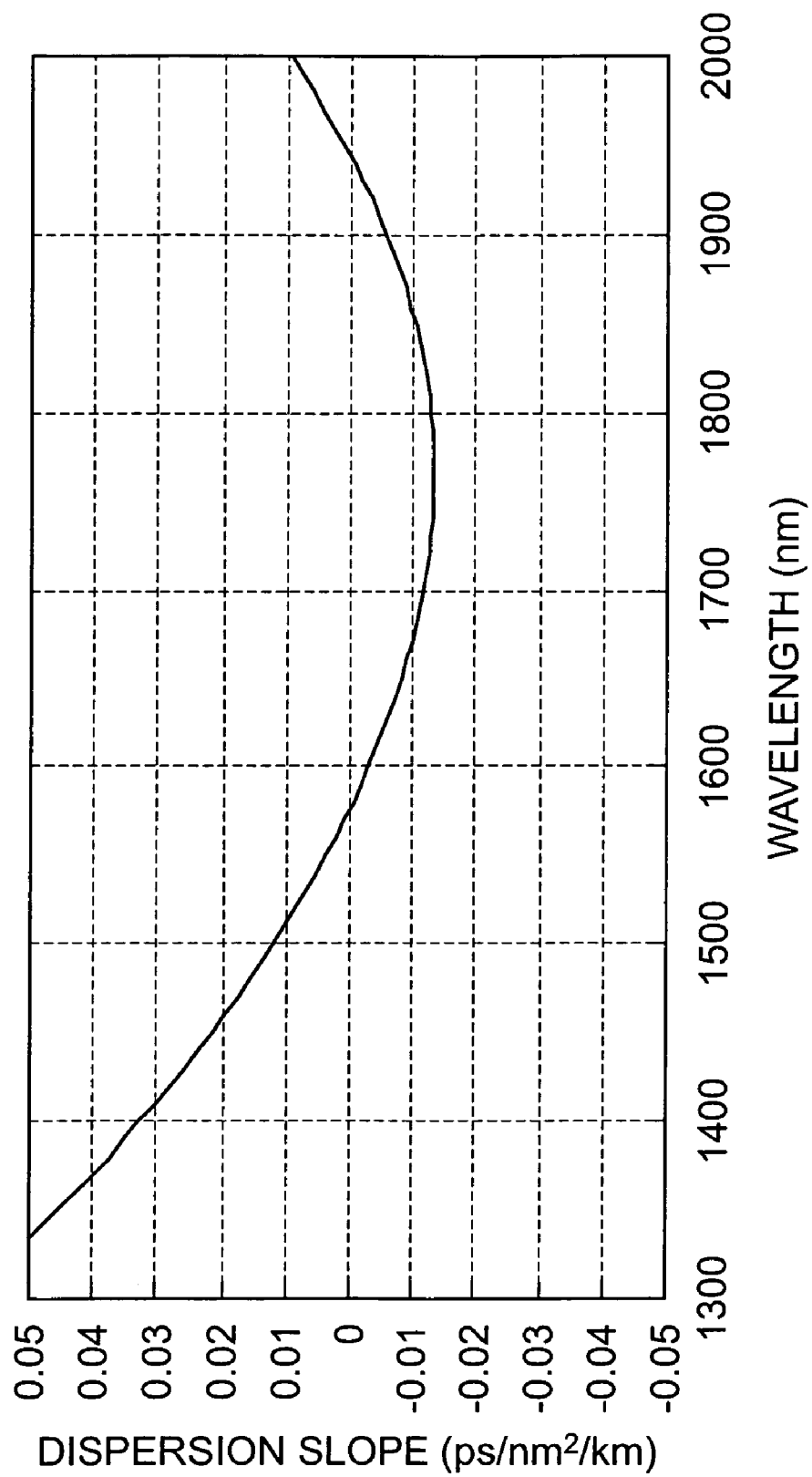
FIG. 21 is a graph showing wavelength dependence of dispersion slope in the optical fiber according to Embodiment 3.
Figure 22:
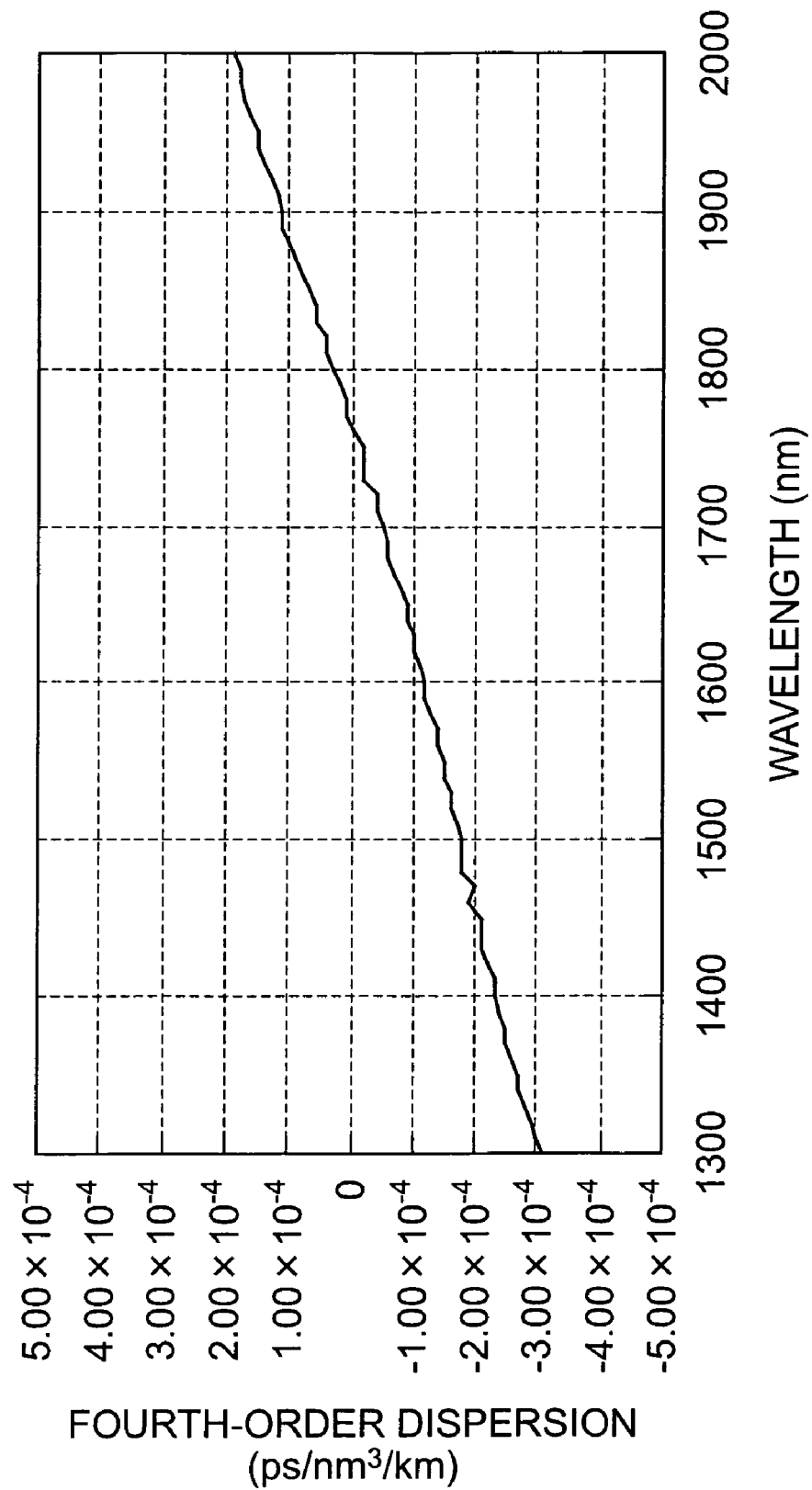
FIG. 22 is a graph showing wavelength dependence of fourth-order dispersion in the optical fiber according to Embodiment 3.

The optical fiber according to Embodiment 3 has the third structure shown in FIG. 3. FIG. 19 is a refractive index profile of the optical fiber according to Embodiment 3 (showing the refractive indices of the respective portions along the radial direction). FIG. 20 is a graph showing the wavelength dependence of chromatic dispersion in the optical fiber according to Embodiment 3. FIG. 21 is a graph showing the wavelength dependence of dispersion slope in the optical fiber according to Embodiment 3. FIG. 22 is a graph showing the wavelength dependence of fourth-order dispersion in the optical fiber according to Embodiment 3.

In this optical fiber according to Embodiment 3, as shown in FIG. 19, the relative refractive index difference $\Delta 1$ of the center core region with respect to the outside cladding region is 1.72%, the relative refractive index difference $\Delta 2$ of the first depressed region with respect to the outside cladding region is −0.83%, the relative refractive index difference $\Delta 3$ of the ring region with respect to the outside cladding region is 0.37%, and the relative refractive index difference $\Delta 4$ of the second depressed region with respect to the outside cladding region is −0.06%. The ratio Ra (=2a/2b) is 0.67, the ratio Rb (=2b/2c) is 0.60, and the ratio Rc (=2c/2d) is 0.75. The radius a of the center core region is 5.27 μm.

In this structure, the optical fiber according to Embodiment 3 has two zero dispersion wavelengths, the wavelength of 1531 nm and the wavelength of 1645 nm. As can be seen from FIG. 20, the wavelength band where the chromatic dispersion falls within the range of ±0.25 ps/nm/km centered around −0.04 ps/nm/km is 1500 nm–1680 nm (width: 180 nm). Furthermore, in the optical fiber according to Embodiment 3, the dispersion slope also has lower wavelength dependence, as shown in FIG. 21, than that in the comparative example. As can be also seen from FIG. 22, the fourth-order dispersion at the wavelength of 1520 nm is $-1.6 \times 10^{-4}$ $ps/nm^3/km$, and the fourth-order dispersion at the wavelength of 1620 nm $-1.0 \times 10^{-4}$ $ps/nm^3/km$. Therefore, the fourth-order dispersion in the optical fiber according to Embodiment 3 also has the small absolute value.

The optical fiber according to Embodiment 3 has the following parameters as characteristics at the wavelength of 1550 nm. Namely, the effective area $A_{eff}$ is 15.9 $\mu m^2$. The mode field diameter is 4.5 μm. The nonlinear coefficient is 12 (1/W/km). The transmission loss is 0.45 dB/km. The fiber cutoff wavelength is 1370 nm. The polarization mode dispersion is 0.02 $ps/km^{1/2}$. The splicing loss with a standard single mode fiber is 0.2 dB/Splice or less.

Embodiment 4

Figure 23:
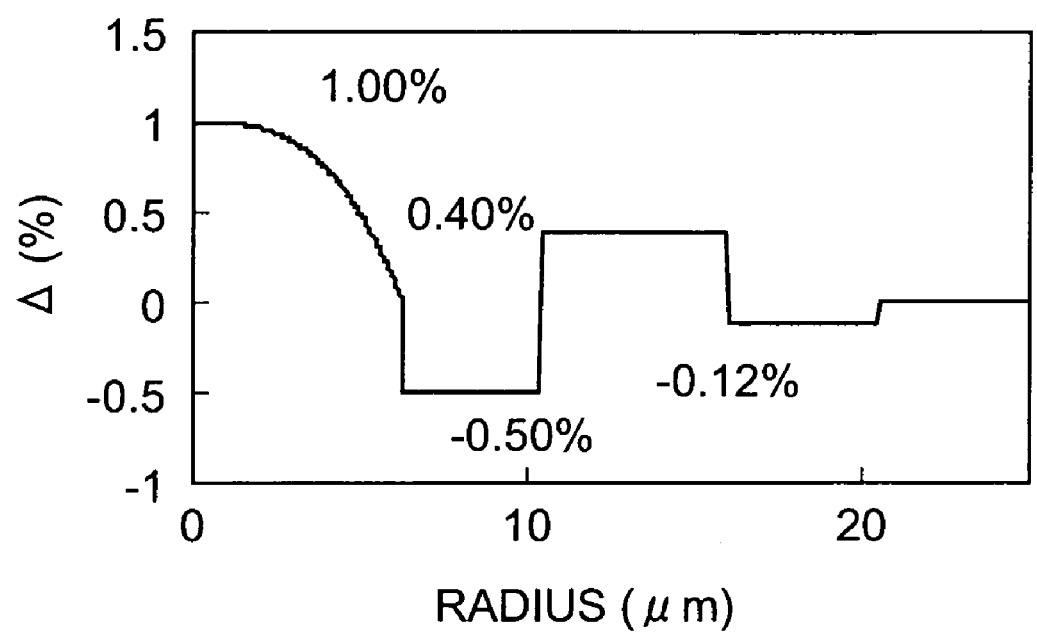
FIG. 23 is a refractive index profile of an optical fiber according to Embodiment 4.
Figure 24:
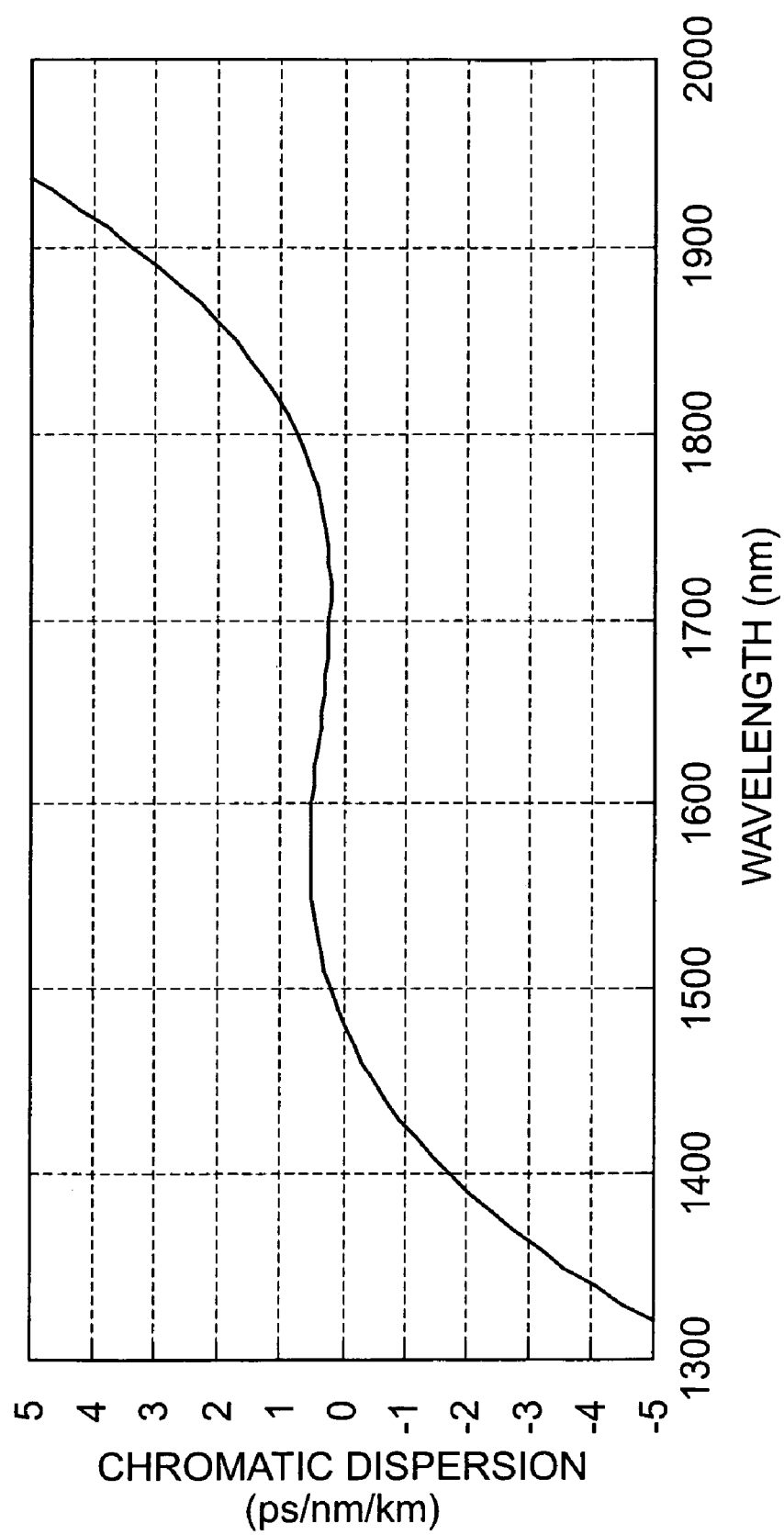
FIG. 24 is a graph showing wavelength dependence of chromatic dispersion in the optical fiber according to Embodiment 4.
Figure 25:
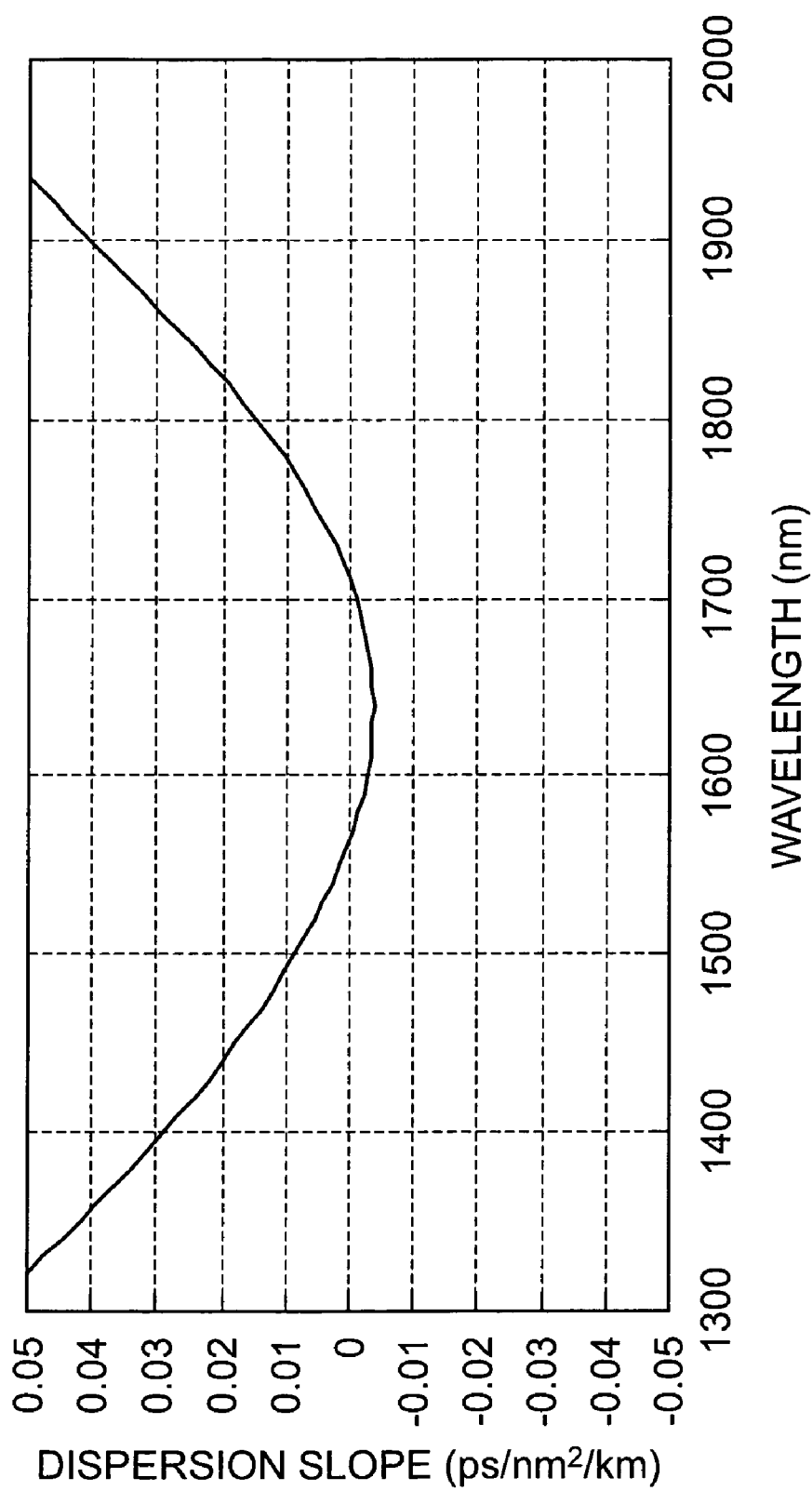
FIG. 25 is a graph showing wavelength dependence of dispersion slope in the optical fiber according to Embodiment 4.
Figure 26:
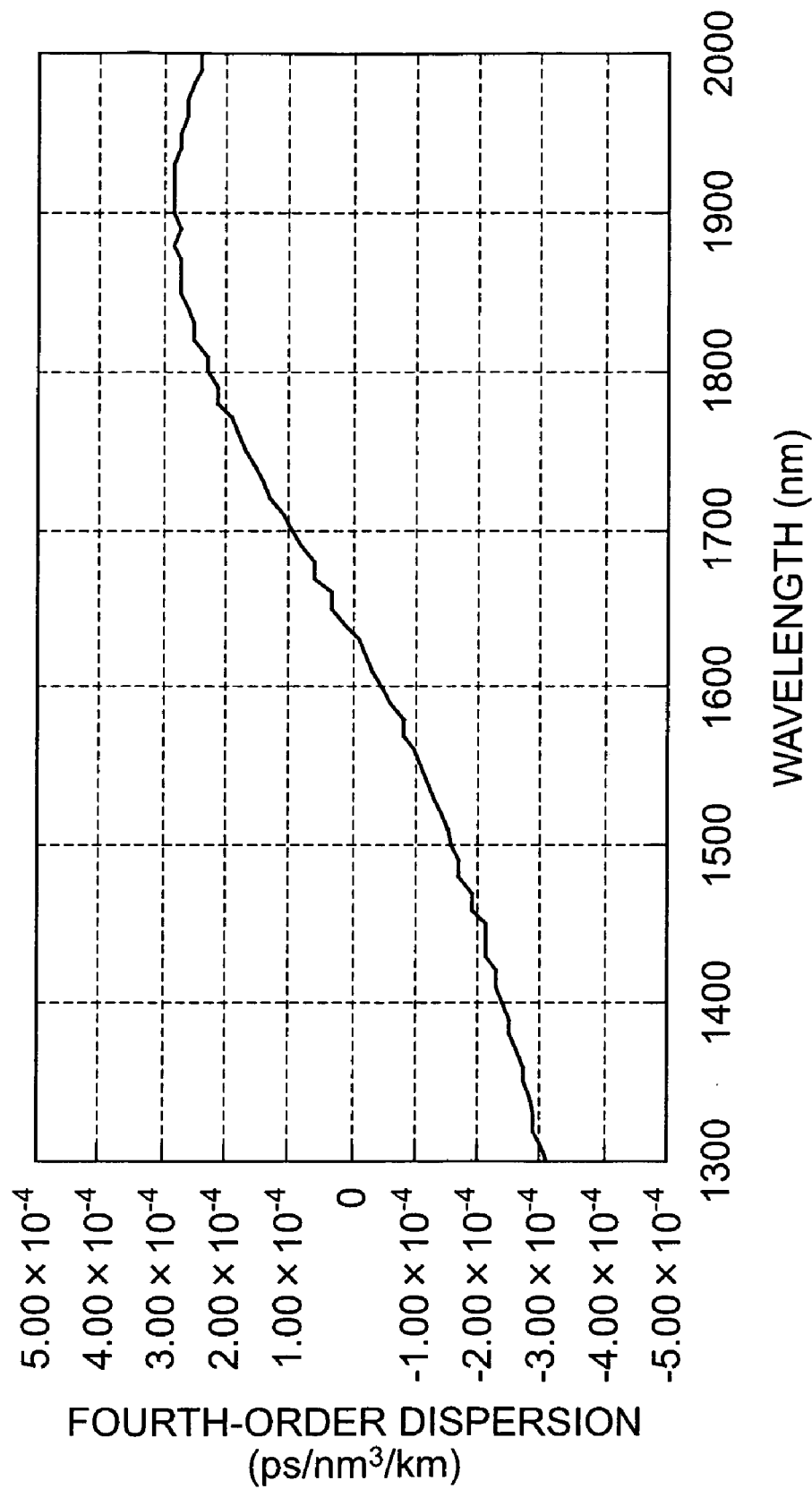
FIG. 26 is a graph showing wavelength dependence of fourth-order dispersion in the optical fiber according to Embodiment 4.

The optical fiber according to Embodiment 4 has the third structure shown in FIG. 3. FIG. 23 is a refractive index profile of the optical fiber according to Embodiment 4 (showing the refractive indices of the respective portions along the radial direction). FIG. 24 is a graph showing the wavelength dependence of chromatic dispersion in the optical fiber according to Embodiment 4. FIG. 25 is a graph showing the wavelength dependence of dispersion slope in the optical fiber according to Embodiment 4. FIG. 26 is a graph showing the wavelength dependence of fourth-order dispersion in the optical fiber according to Embodiment 4.

In the optical fiber according to Embodiment 4, as shown in FIG. 23, the relative refractive index difference $\Delta 1$ of the center core region with respect to the outside cladding region is 1.00%, the relative refractive index difference $\Delta 2$ of the first depressed region with respect to the outside cladding region is −0.50%, the relative refractive index difference Δ3 of the ring region with respect to the outside cladding region is 0.40%, and the relative refractive index difference Δ4 of the second depressed region with respect to the outside cladding region is −0.12%. The ratio Ra (=2a/2b) is 0.61, the ratio Rb (=2b/2c) is 0.65, and the ratio Rc (=2c/2d) is 0.78. The radius a of the center core region is 6.32 µm.

In this case, the wavelength band where the chromatic dispersion falls within the range of ±0.25 ps/nm/km centered around −0.31 ps/nm/km is 1490 nm–1780 nm (width: 290 nm), as can be seen from FIG. 24. In the optical fiber according to Embodiment 4, the dispersion slope also has lower wavelength dependence, as shown in FIG. 25, than that in the comparative example. As can be also seen from FIG. 26, the fourth-order dispersion at the wavelength of 1520 nm is $-1.4 \times 10^{-4}$ ps/nm$^3$/km, and the fourth-order dispersion at the wavelength of 1620 nm $-0.2 \times 10^{-4}$ ps/nm$^3$/km. Therefore, the fourth-order dispersion in the optical fiber according to Embodiment 4 also has the extremely small absolute value.

The optical fiber according to Embodiment 4 has the following parameters as characteristics at the wavelength of 1550 nm. Namely, the effective area $A_{eff}$ is 15.9 µm$^2$. The mode field diameter is 4.5 µm. The nonlinear coefficient is 12 (1/W/km). The transmission loss is 0.45 dB/km. The fiber cutoff wavelength is 1370 nm. The polarization mode dispersion is 0.02 ps/km$^{1/2}$. The splicing loss with a standard single mode fiber is 0.2 dB/Splice or less.

Embodiment 5

Figure 27:
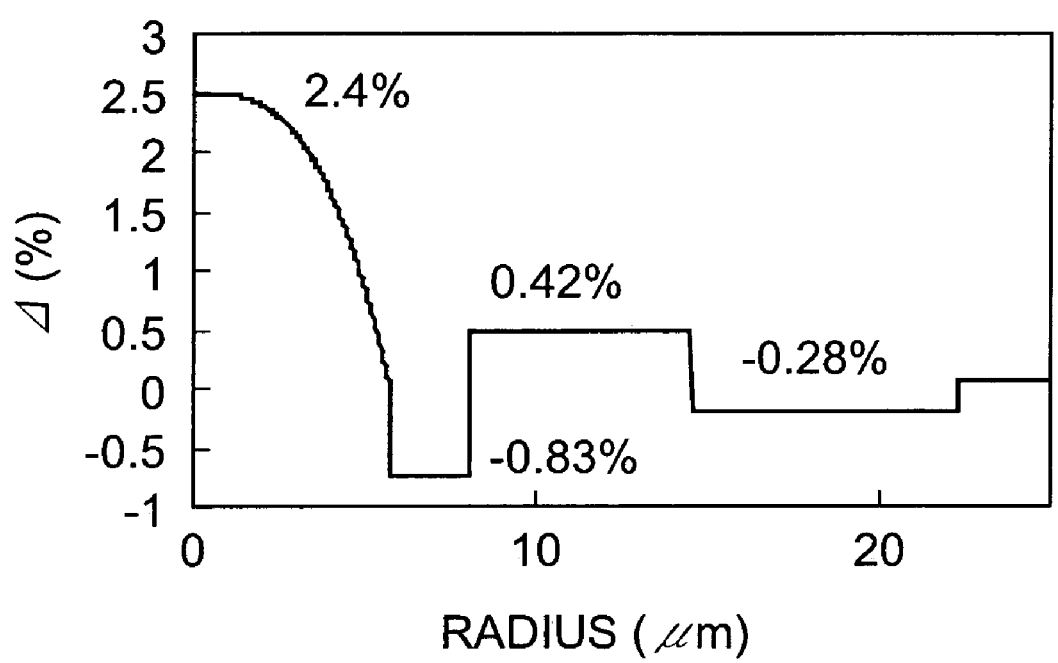
FIG. 27 is a refractive index profile of an optical fiber according to Embodiment 5.
Figure 28:
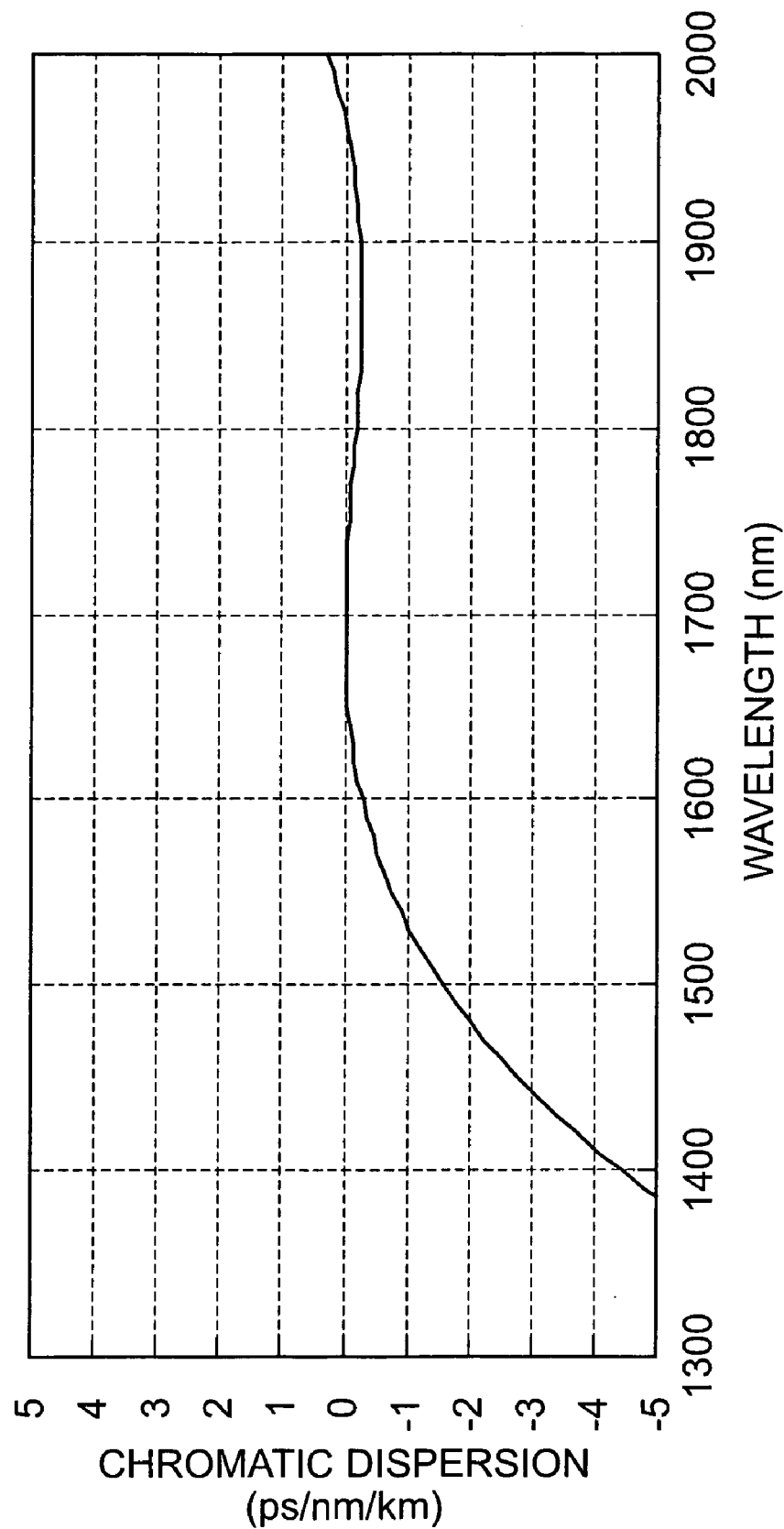
FIG. 28 is a graph showing wavelength dependence of chromatic dispersion in the optical fiber according to Embodiment 5.
Figure 29:
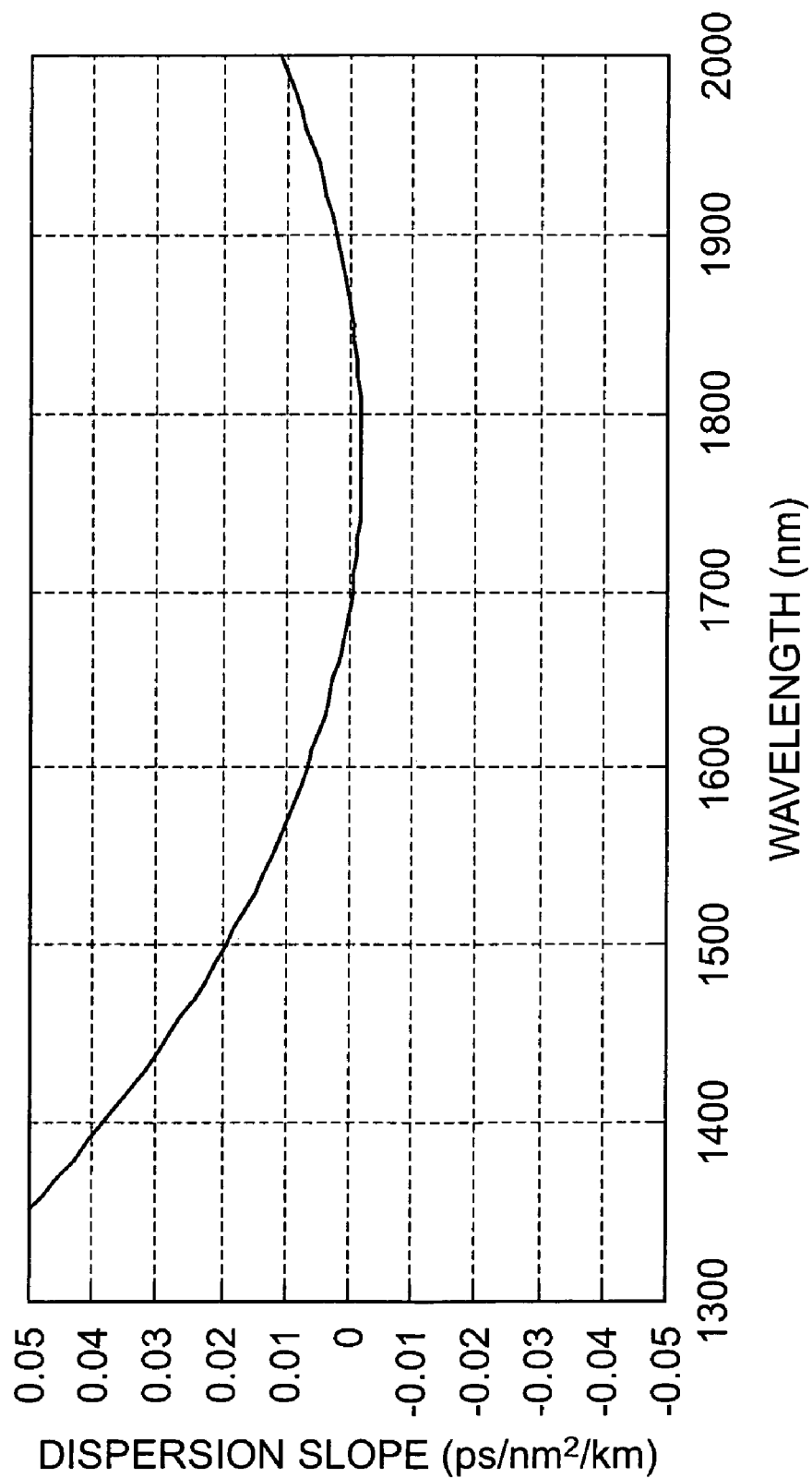
FIG. 29 is a graph showing wavelength dependence of dispersion slope in the optical fiber according to Embodiment 5.
Figure 30:
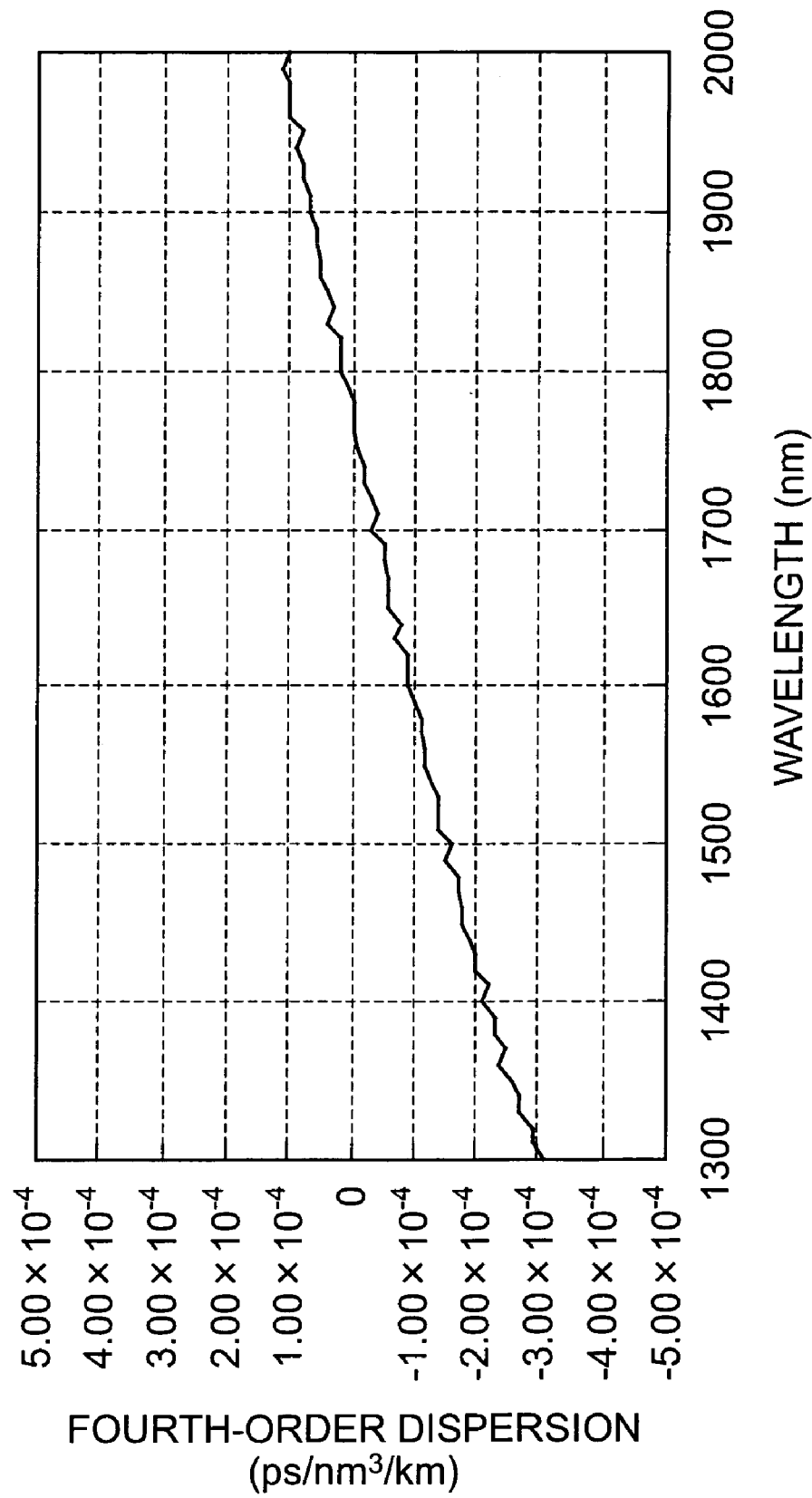
FIG. 30 is a graph showing wavelength dependence of fourth-order dispersion in the optical fiber according to Embodiment 5.

The optical fiber according to Embodiment 5 has the third structure shown in FIG. 3. FIG. 27 is a refractive index profile of the optical fiber according to Embodiment 5 (showing the refractive indices of the respective portions along the radial direction). FIG. 28 is a graph showing the wavelength dependence of chromatic dispersion in the optical fiber according to Embodiment 5. FIG. 29 is a graph showing the wavelength dependence of dispersion slope in the optical fiber according to Embodiment 5. FIG. 30 is a graph showing the wavelength dependence of fourth-order dispersion in the optical fiber according to Embodiment 5.

In the optical fiber according to Embodiemnt 5, as shown in FIG. 27, the relative refractive index difference Δ1 of the center core region with respect to the outside cladding region is 2.4%, the relative refractive index difference Δ2 of the first depressed region with respect to the outside cladding region is −0.83%, the relative refractive index difference Δ3 of the ring region with respect to the outside cladding region is 0.42%, and the relative refractive index difference Δ4 of the second depressed region with respect to the outside cladding region is −0.28%. The ratio Ra (=2a/2b) is 0.71, the ratio Rb (=2b/2c) is 0.56, and the ratio Rc (=2c/2d) is 0.65. The radius a of the center core region is 4.83 µm.

In this case, the wavelength band where the chromatic dispersion falls within the range of ±0.25 ps/nm/km centered around −0.25 ps/nm/km is 1570 nm–1960 nm (width: 390 nm), as can be seen from FIG. 28. In the optical fiber according to Embodiment 5, the dispersion slope also has lower wavelength dependence, as shown in FIG. 29, than that in the comparative example. As can be also seen from FIG. 30, the fourth-order dispersion at the wavelength of 1520 nm is $-1.4 \times 10^{-4}$ ps/nm$^3$/km, and the fourth-order dispersion at the wavelength of 1620 nm is $-0.9 \times 10^{-4}$ ps/nm$^3$/km. Therefore, the fourth-order dispersion in the optical fiber according to Embodiment 5 also has the small absolute value. As described above, the optical fiber according to Embodiment 5 is the optical fiber with the wide chromatic-dispersion-flattened band and good fiber, particularly, with the high nonlinear coefficient.

The optical fiber according to Embodiment 5 has the following parameters as characteristics at the wavelength of 1550 nm. Namely, the effective area $A_{eff}$ is 12.4 µm$^2$. The mode field diameter is 4.0 µm. The nonlinear coefficient is 17 (1/W/km). The transmission loss is 0.60 dB/km. The fiber cutoff wavelength is 1460 nm. The polarization mode dispersion is 0.03 ps/km$^{1/2}$. In particular, the nonlinear coefficient is as large as 17 (1/W/km), which is preferred. The splicing loss with a standard single mode optical fiber is about 0.5 dB/Splice or less through the use of a commercially available fusion splicer, and becomes 0.2 dB/Splice or less with application of a method of expanding the mode field diameter of highly nonlinear fiber by thermal diffusion of a dopant.

Embodiment 6

Figure 31:
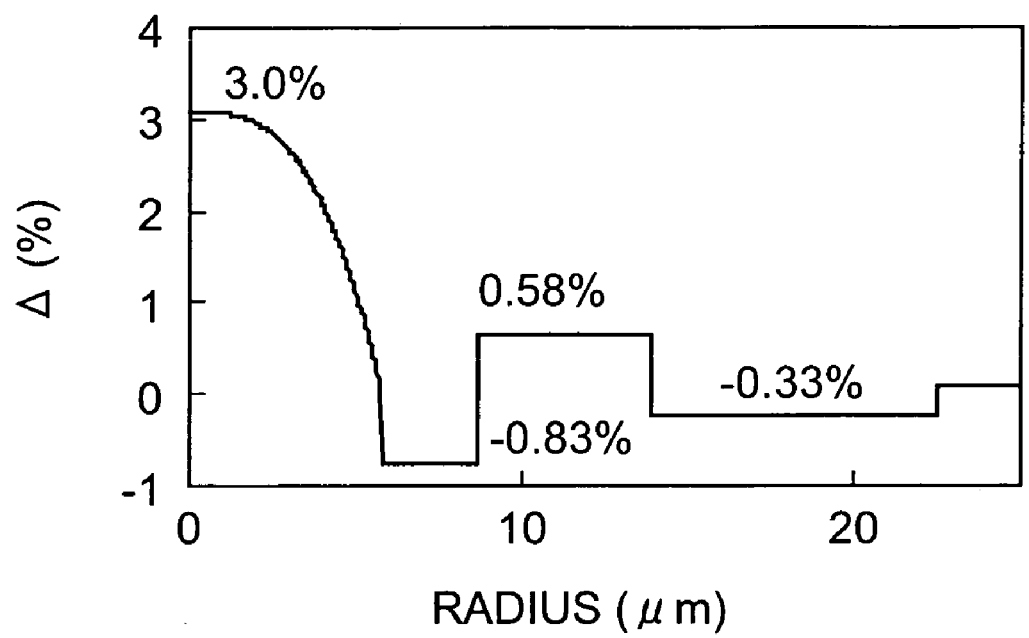
FIG. 31 is a refractive index profile of an optical fiber according to Embodiment 6.
Figure 32:
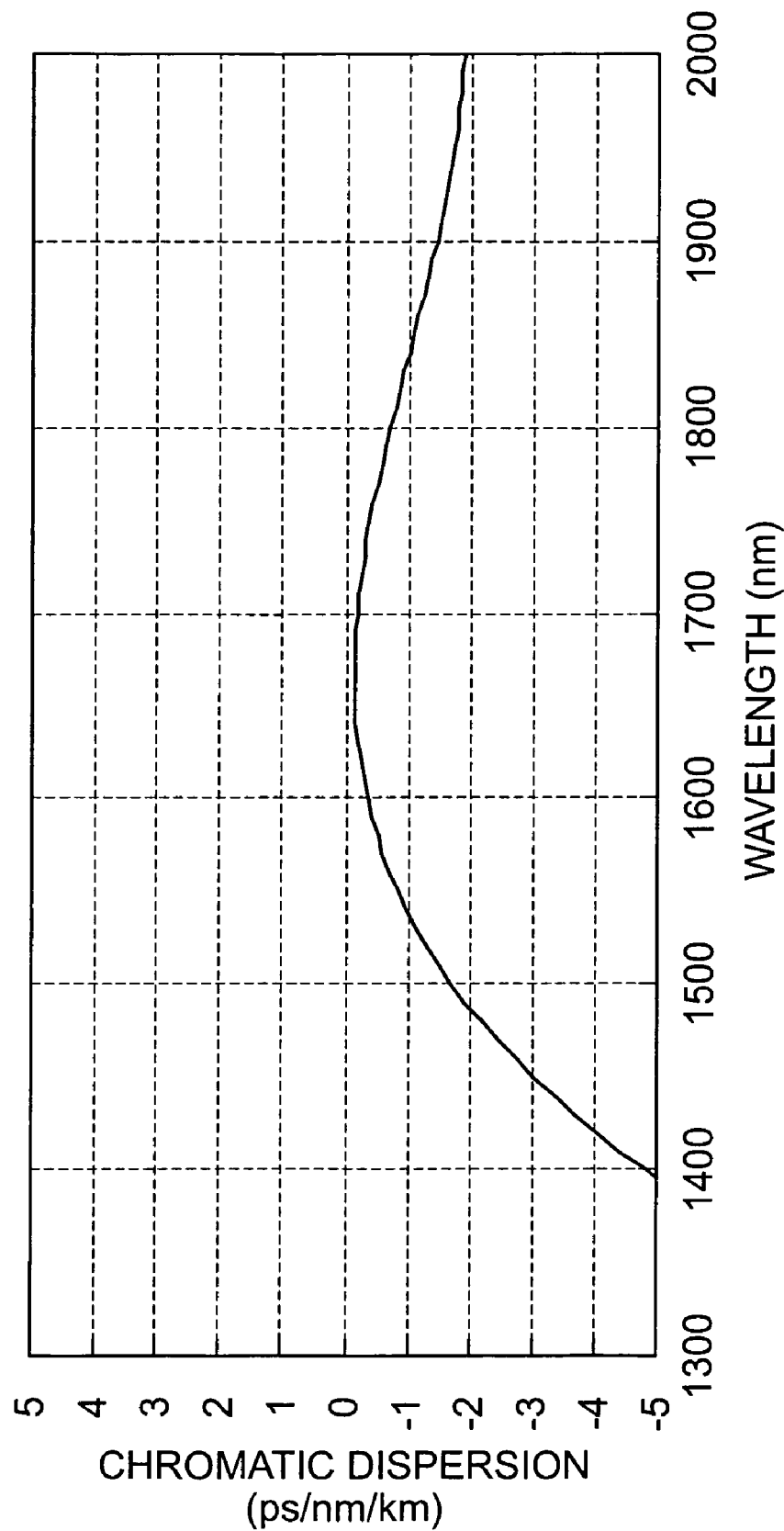
FIG. 32 is a graph showing wavelength dependence of chromatic dispersion in the optical fiber according to Embodiment 6.
Figure 33:
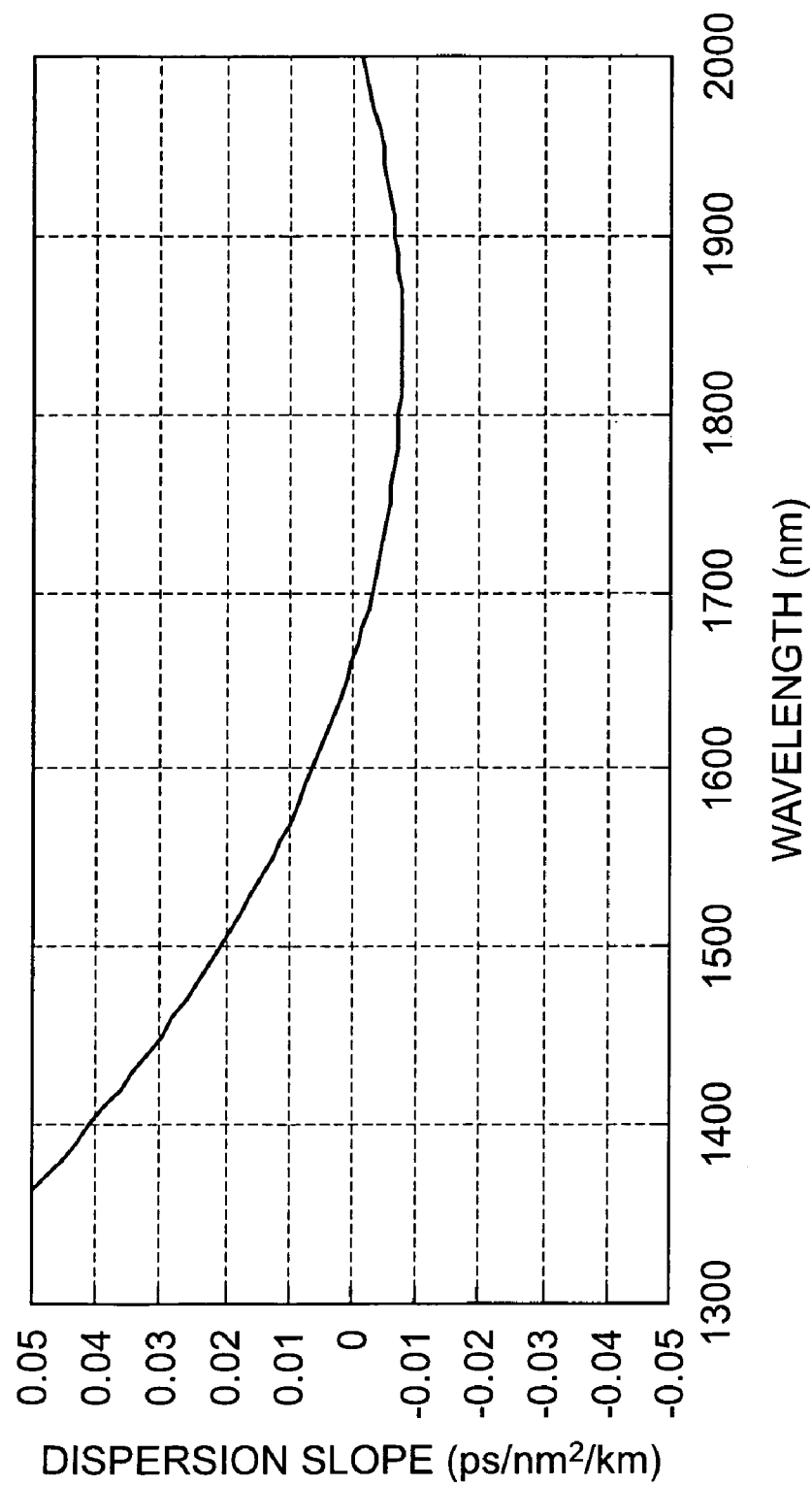
FIG. 33 is a graph showing wavelength dependence of dispersion slope in the optical fiber according to Embodiment 6.
Figure 34:
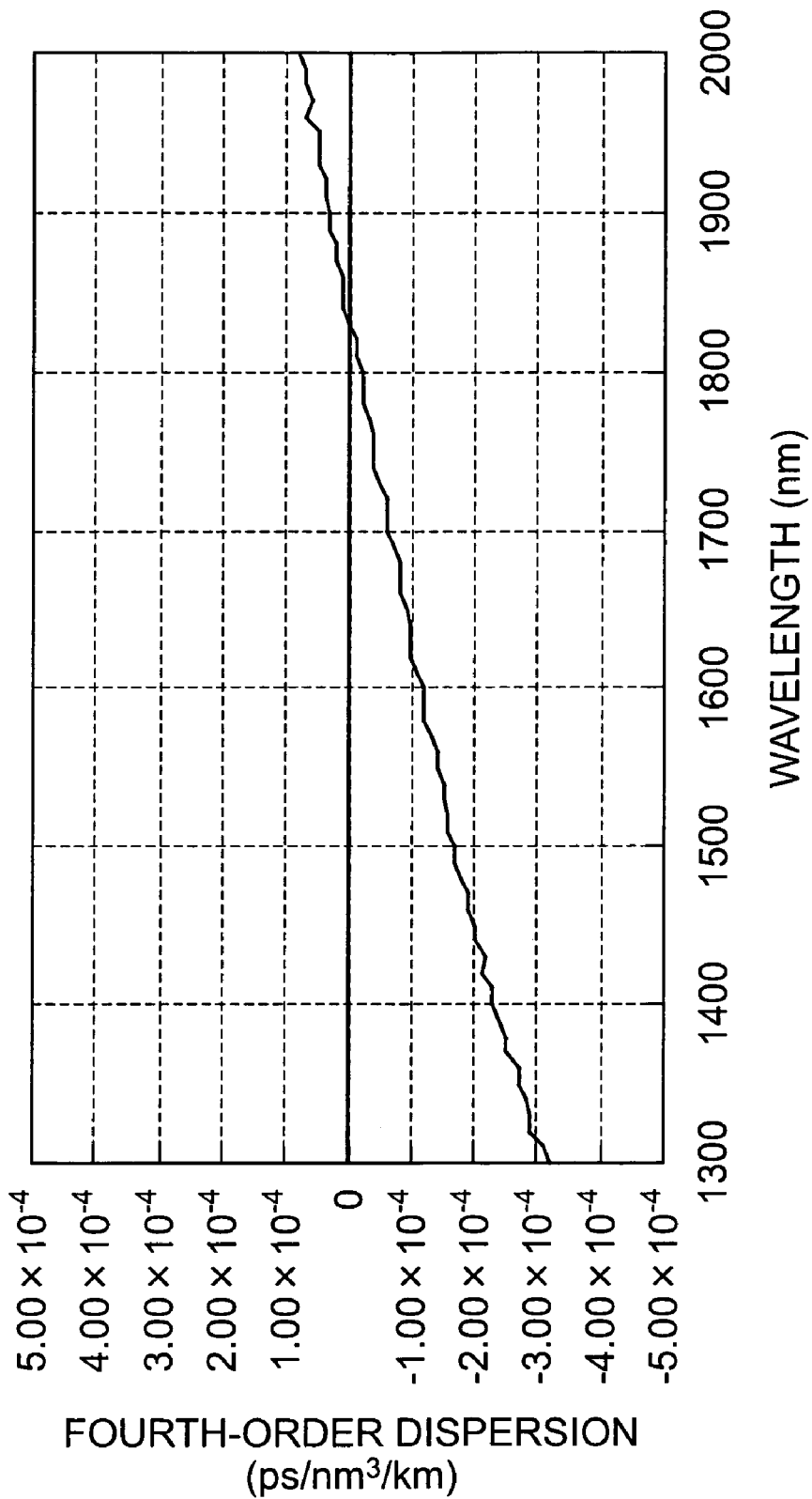
FIG. 34 is a graph showing wavelength dependence of fourth-order dispersion in the optical fiber according to Embodiment 6.

The optical fiber according to Embodiment 6 has the third structure shown in FIG. 3. FIG. 31 is a refractive index profile of the optical fiber according to Embodiment 6 (showing the refractive indices of the respective portions along the radial direction). FIG. 32 is a graph showing the wavelength dependence of chromatic dispersion in the optical fiber according to Embodiment 6. FIG. 33 is a graph showing the wavelength dependence of dispersion slope in the optical fiber according to Embodiment 6. FIG. 34 is a graph showing the wavelength dependence of fourth-order dispersion in the optical fiber according to Embodiment 6.

In the optical fiber according to Embodiemnt 6, as shown in FIG. 31, the relative refractive index difference Δ1 of the center core region with respect to the outside cladding region is 3.0%, the relative refractive index difference Δ2 of the first depressed region with respect to the outside cladding region is −0.83%, the relative refractive index difference Δ3 of the ring region with respect to the outside cladding region is 0.58%, and the relative refractive index difference Δ4 of the second depressed region with respect to the outside cladding region is −0.33%. The ratio Ra (=2a/2b) is 0.67, the ratio Rb (=2b/2c) is 0.62, and the ratio Rc (=2c/2d) is 0.62. The radius a of the center core region is 4.48 µm.

In this case, the wavelength band where the chromatic dispersion falls within the range of ±0.25 ps/nm/km centered around −0.35 ps/nm/km is 1570 nm–1790 nm (width: 220 nm), as can be seen from FIG. 32. In the optical fiber according to Embodiment 6, the dispersion slope also has lower wavelength dependence, as shown in FIG. 33, than that in the comparative example. As can be also seen from FIG. 34, the fourth-order dispersion at the wavelength of 1520 nm is $-1.6 \times 10^{-4}$ ps/nm$^3$/km, and the fourth-order dispersion at the wavelength of 1620 nm $-1.0 \times 10^{-4}$ ps/nm$^3$/km. Therefore, the fourth-order dispersion in the optical fiber according to Embodiment 6 also has the small absolute value. As described above, the optical fiber according to Embodiment 6 is the optical fiber with the wide chromatic-dispersion-flattened band and good fiber, particularly, with the high nonlinear coefficient.

The optical fiber according to Embodiment 6 has the following parameters as characteristics at the wavelength of 1550 nm. Namely, the effective area $A_{eff}$ is 10.2 µm$^2$. The mode field diameter is 3.6 µm. The nonlinear coefficient is 21 (1/W/km). The transmission loss is 0.63 dB/km. The fiber cutoff wavelength is 1500 nm. The polarization mode dispersion is 0.03 ps/km$^{1/2}$. In particular, the nonlinear coefficient is as large as 21 (1/W/km), which is preferred. The splicing loss with a standard single mode optical fiber is about 0.5 dB/Splice or less through the use of a commercially available fusion splicer and becomes 0.2 dB/Splice or less with application of a method of expanding the mode field diameter of highly nonlinear fiber by thermal diffusion of a dopant.

Embodiment 7

Figure 35:
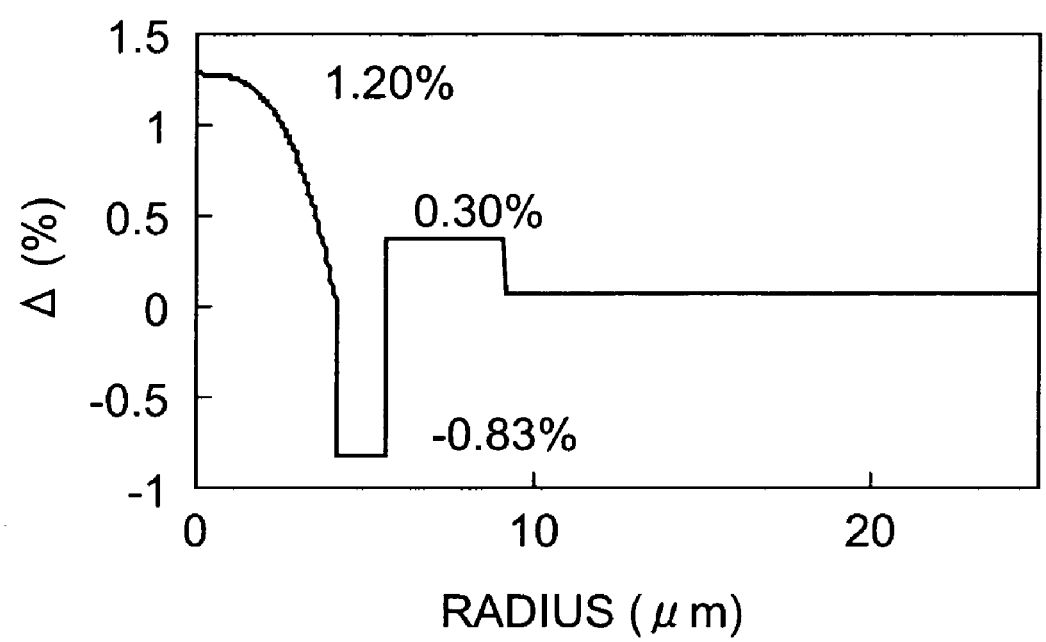
FIG. 35 is a refractive index profile of an optical fiber according to Embodiment 7.
Figure 36:
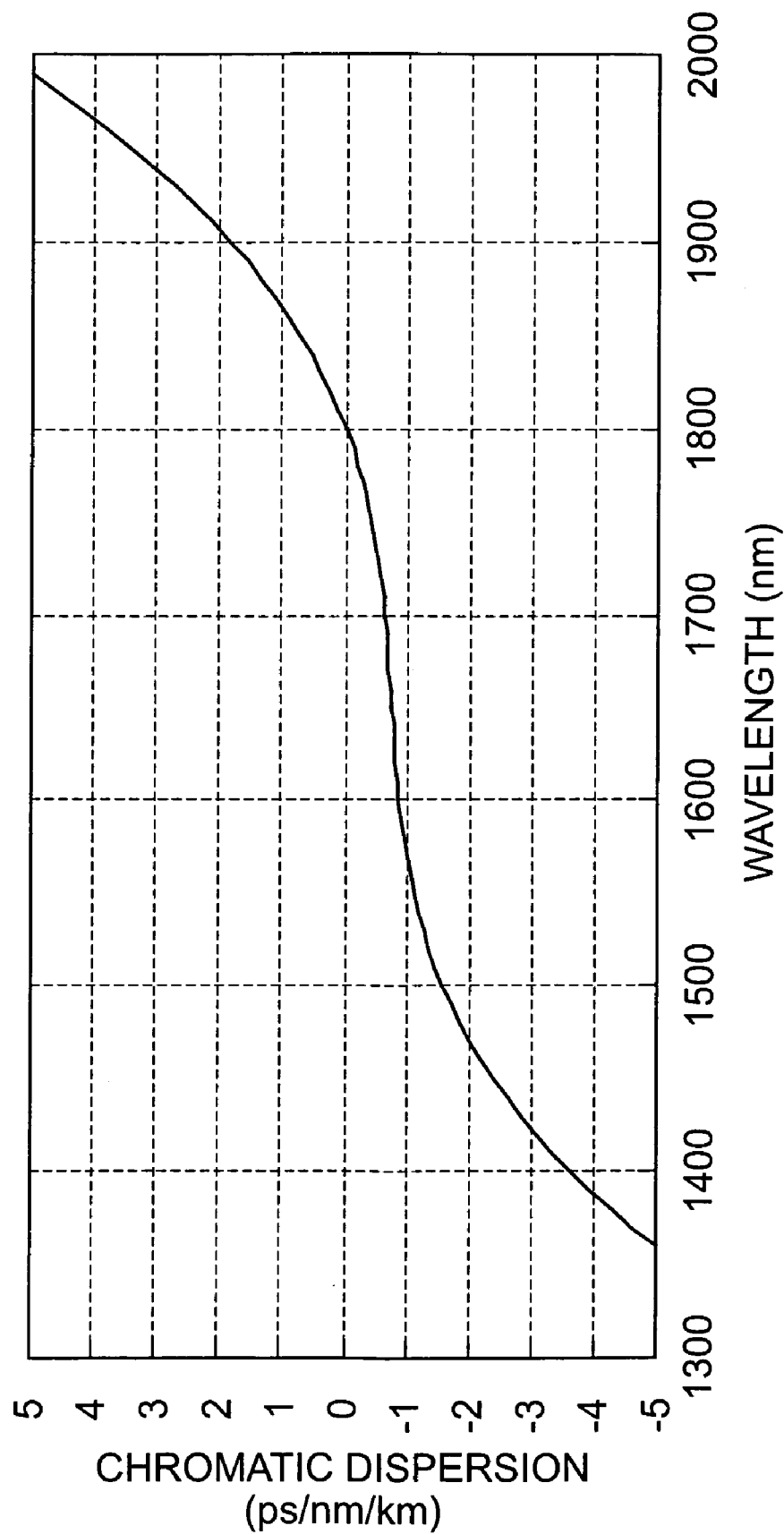
FIG. 36 is a graph showing wavelength dependence of chromatic dispersion in the optical fiber according to Embodiment 7.
Figure 37:
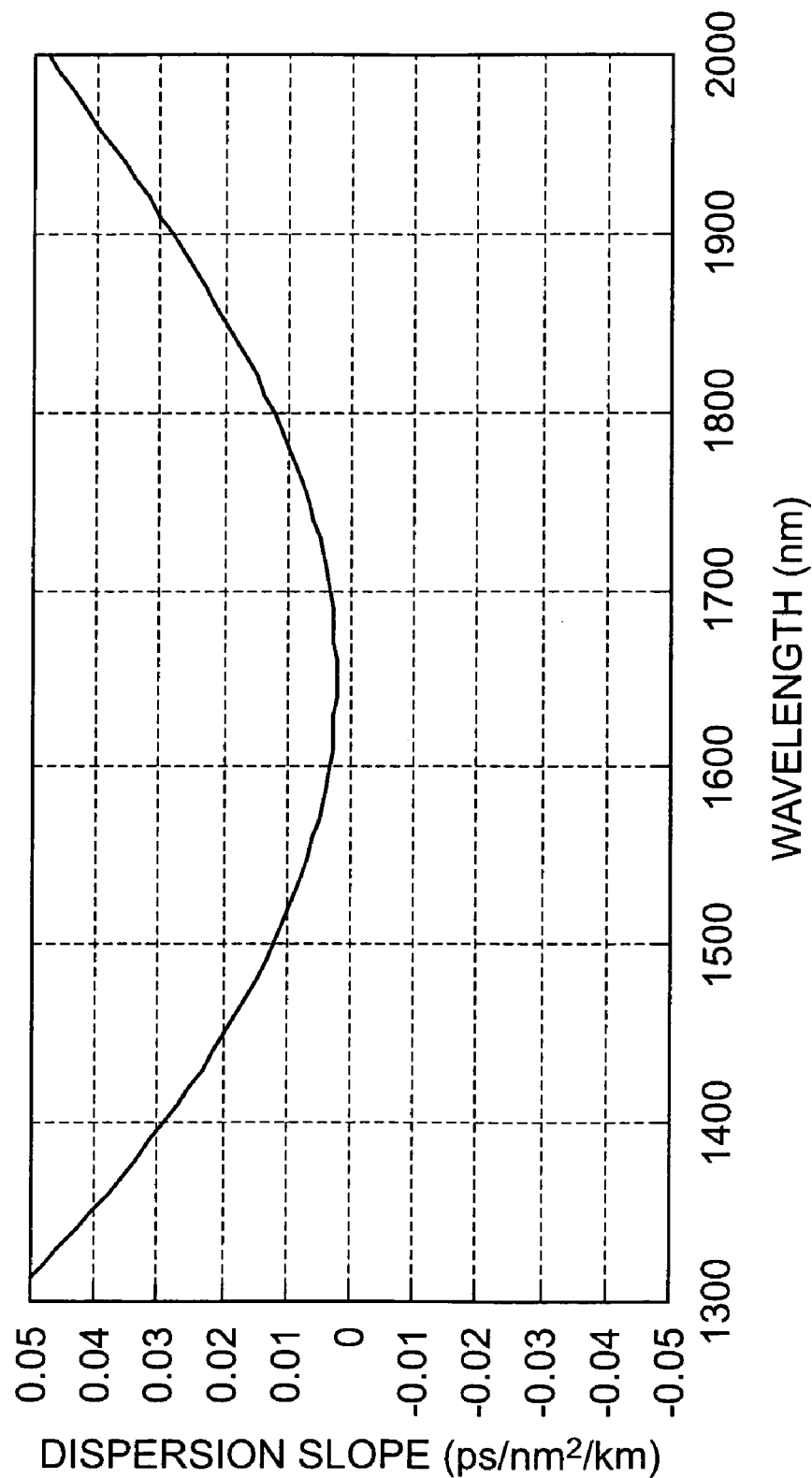
FIG. 37 is a graph showing wavelength dependence of dispersion slope in the optical fiber according to Embodiment 7.
Figure 38:
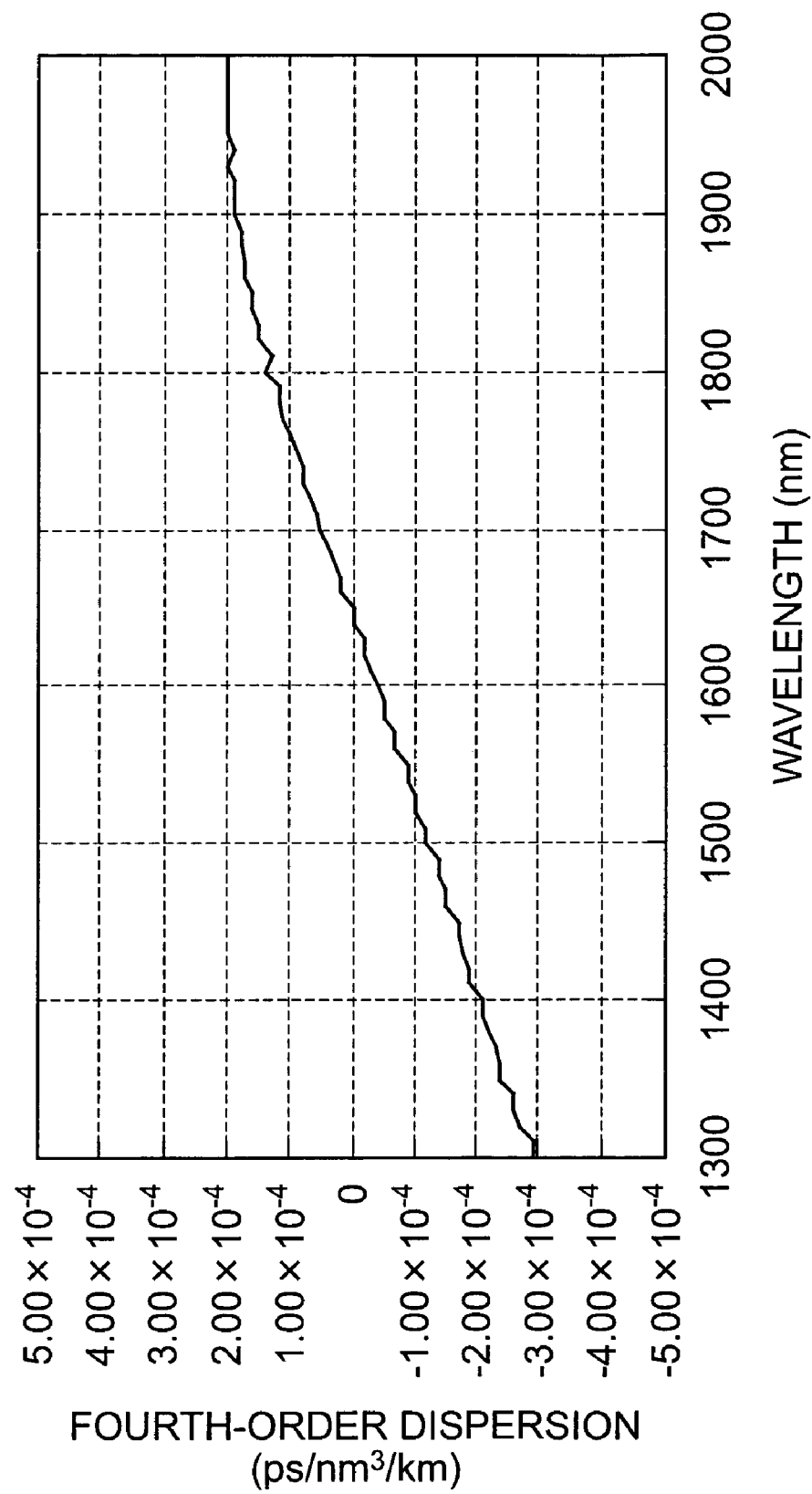
FIG. 38 is a graph showing wavelength dependence of fourth-order dispersion in the optical fiber according to Embodiment 7.

The optical fiber according to Embodiment 7 has the second structure shown in FIG. 2. FIG. 35 is a refractive index profile of the optical fiber according to Embodiment 7 (showing the refractive indices of the respective portions along the radial direction). FIG. 36 is a graph showing the wavelength dependence of chromatic dispersion in the optical fiber according to Embodiment 7. FIG. 37 is a graph showing the wavelength dependence of dispersion slope in the optical fiber according to Embodiment 7. FIG. 38 is a graph showing the wavelength dependence of fourth-order dispersion in the optical fiber according to Embodiment 7.

In the optical fiber according to Embodiment 7, as shown in FIG. 35, the relative refractive index difference Δ1 of the center core region with respect to the outside cladding region is 1.20%, the relative refractive index difference Δ2 of the first depressed region with respect to the outside cladding region is –0.83%, and the relative refractive index difference Δ3 of the ring region with respect to the outside cladding region is 0.30%. The ratio Ra (=2a/2b) is 0.74 and the ratio Rb (=2b/2c) is 0.62. The radius a of the center core region is 6.02 μm.

In this case, the wavelength band where the chromatic dispersion falls within the range of ±0.25 ps/nm/km centered around –0.75 ps/nm/km is 1570 nm–1740 nm (width: 170 nm), as can be seen from FIG. 36, and it is thus feasible to realize the optical fiber with the wide chromatic-dispersion-flattened band. In the optical fiber according to Embodiment 7, the dispersion slope also has lower wavelength dependence, as shown in FIG. 37, than that in the comparative example. As can be also seen from FIG. 38, the fourth-order dispersion at the wavelength of 1520 nm is –1.0×10$^{-4}$ ps/nm$^3$/km, and the fourth-order dispersion at the wavelength of 1620 nm –0.2×10$^{-4}$ ps/nm$^3$/km. Therefore, the fourth-order dispersion in the optical fiber according to Embodiment 7 also has the small absolute value.

The optical fiber according to Embodiment 7 has the following parameters as characteristics at the wavelength of 1550 nm. Namely, the effective area $A_{eff}$ is 22.1 μm$^2$. The mode field diameter is 5.4 μm. The nonlinear coefficient is 7.4 (1/W/km). The transmission loss is 0.30 dB/km. The fiber cutoff wavelength is 1460 nm. The polarization mode dispersion is 0.01 ps/km$^{1/2}$. In particular, the nonlinear coefficient is as large as 21 (1/W/km), which is preferred. The splicing loss with a standard single mode optical fiber is about 0.2 dB/Splice or less.

Embodiments 8 and 9

Figure 39:
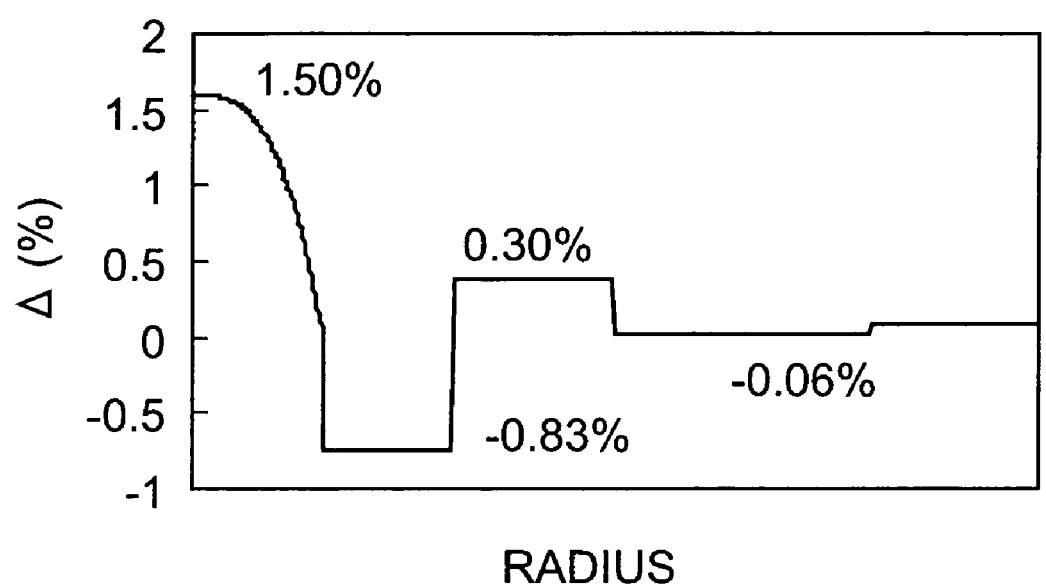
FIG. 39 is a refractive index profile of an optical fiber according to Embodiment 8.

The optical fiber according to Embodiment 8 has the third structure shown in FIG. 3. FIG. 39 is a refractive index profile of the optical fiber according to Embodiment 8 (showing the refractive indices of the respective portions along the radial direction).

In the optical fiber according to Embodiment 8, as shown in FIG. 39, the relative refractive index difference Δ1 of the center core region with respect to the outside cladding is 1.50%, the relative refractive index difference Δ2 of the first depressed region with respect to the outside cladding region is –0.83%, the relative refractive index difference Δ3 of the ring region with respect to the outside cladding region is 0.30%, and the relative refractive index difference Δ4 of the second depressed region with respect to the outside cladding region is –0.06%. The ratio Rb (=2b/2c) is 0.62, and the ratio Rc (=2c/2d) is 0.62. With samples having different ratios Ra (=2a/2b), various characteristics were checked where the chromatic dispersion at the wavelength of 1.58 μm was within the range of –0.5 to 0 ps/nm/km. FIG. 40 is a table of the characteristics of Samples 1-12 of optical fibers according to Embodiment 8.

Figure 41:
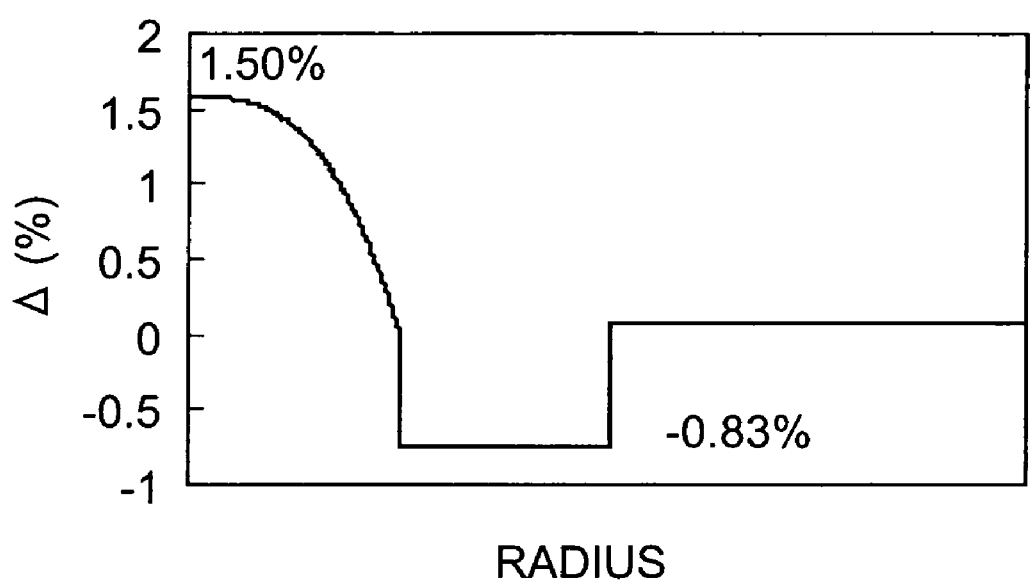
FIG. 41 is a refractive index profile of an optical fiber according to Embodiment 9.

On the other hand, the optical fiber according to Embodiment 9 has the first structure shown in FIG. 1. FIG. 41 is a refractive index profile of the optical fiber according to Embodiment 9 (showing the refractive indices of the respective portions along the radial direction).

In the optical fiber according to Embodiment 9, as shown in FIG. 41, the relative refractive index difference Δ1 of the center core region with respect to the outside cladding region is 1.50%, and the relative refractive index difference Δ2 of the first depressed region with respect to the outside cladding region is –0.83%. Regarding samples having different ratios Ra (=2a/2b), various characteristics were checked where the chromatic dispersion at the wavelength of 1.58 μm was within the range of –0.5 to 0 ps/nm/km. FIG. 42 is a table of the characteristics of Samples 1 to 10 of optical fibers according to Embodiemnt 9.

In each of FIGS. 40 and 42, the following characteristics are listed in order from the left: ratio Ra (=2a/2b); chromatic dispersion at the wavelength of 1.58 μm (Disp. at 1.58); minimum absolute value of the dispersion slope in the wavelength range of 1.52 to 1.62 μm (min. slope 1.52-1.62); minimum absolute value of the fourth-order dispersion in the wavelength range of 1.52 to 1.62 μm (min. 4th disp 1.52-1.62); width of the wavelength band where a variation of chromatic dispersion is 0.5 ps/nm/km (0.5 bandwidth); zero dispersion wavelength; effective area ($A_{eff}$); mode field diameter (MFD); nonlinear coefficient; and cutoff wavelength. It is noted that these tables also show unpreferred examples.

Figure 43:
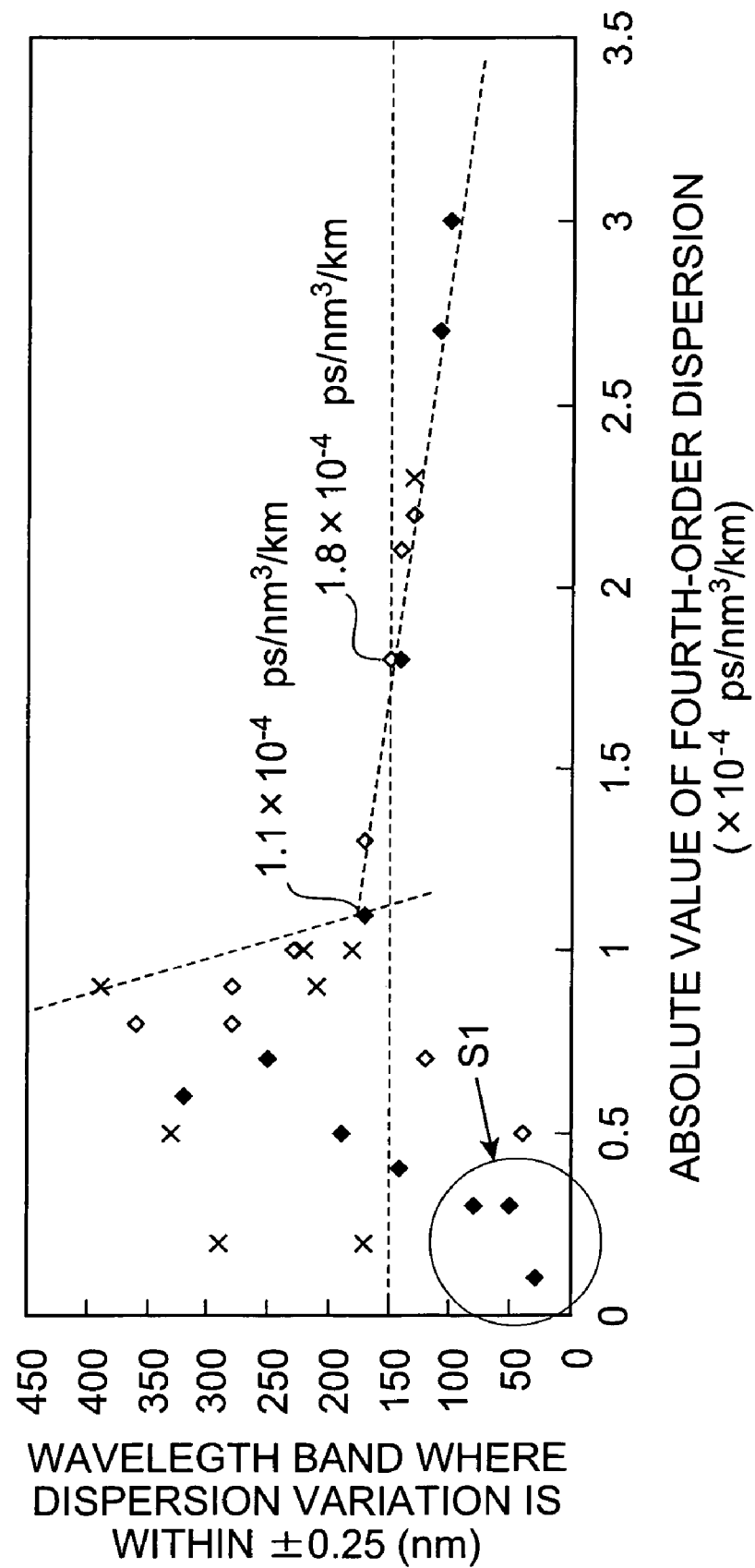
FIG. 43 is a graph showing the relationship between widths of a wavelength band where a variation of chromatic dispersion is 0.5 ps/nm/km or less, and minimum absolute values of fourth-order dispersion, for the optical fibers according to Embodiments 8 and 9.
Figure 44:
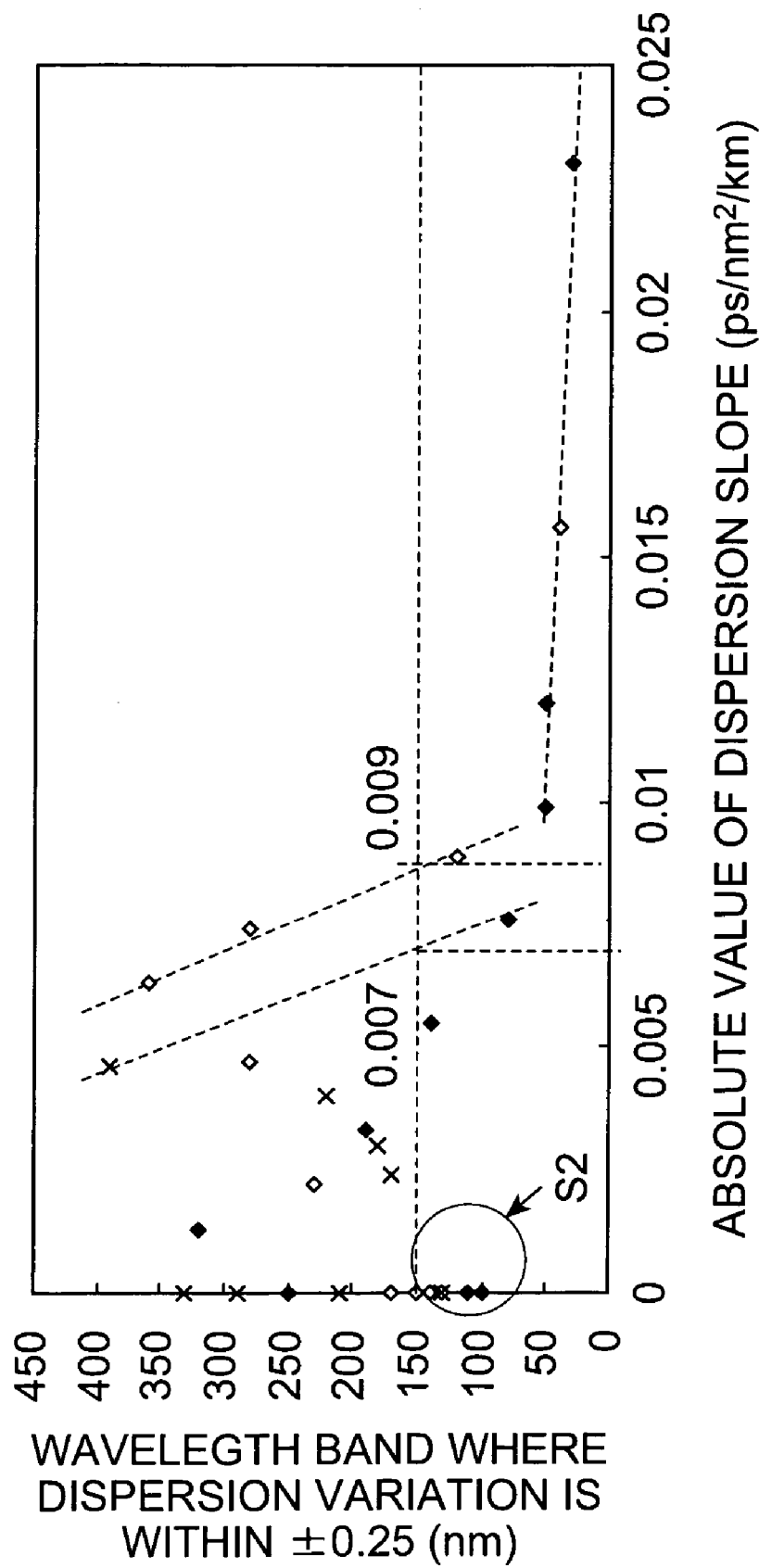
FIG. 44 is a graph showing the relationship between widths of a wavelength band where a variation of chromatic dispersion is 0.5 ps/nm/km or less, and minimum absolute values of dispersion slope, for the optical fibers according to Embodiments 8 and 9.
Figure 45:
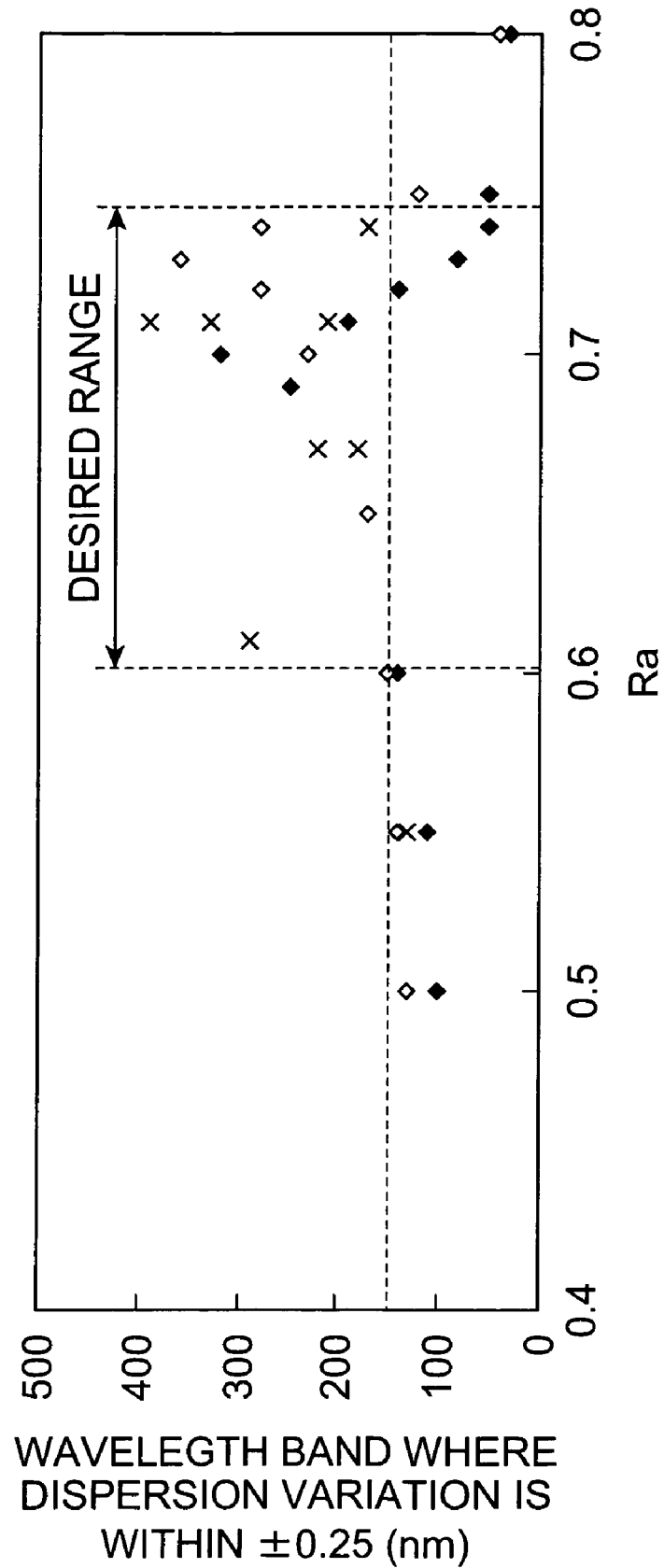
FIG. 45 is a graph showing the relationship between widths of a wavelength band where a variation of chromatic dispersion is 0.5 ps/nm/km or less, and ratios Ra, for the optical fibers according to Embodiments 8 and 9.

FIG. 43 is a graph showing the relationship between widths of the wavelength band where the variation of chromatic dispersion is 0.5 ps/nm/km or less, and minimum absolute values of the fourth-order dispersion, for the optical fibers according to Embodiments 8 and 9. FIG. 44 is a graph showing the relationship between widths of the wavelength band where the variation of the chromatic dispersion is 0.5 ps/nm/km or less, and minimum absolute values of the dispersion slope, for the optical fibers according to Embodiments 8 and 9. FIG. 45 is a graph showing the relationship between widths of the wavelength band where the variation of chromatic dispersion is 0.5 ps/nm/km or less, and ratios Ra, for the optical fibers according to Embodiments 8 and 9. These FIGS. 43 to 45 also show data about each of the optical fibers of aforementioned Comparative Example 1 and Embodiments 1 to 7 (× points in each figure), in addition to the data about the optical fibers according to Embodiment 8 (solid plot points in each figure) and the data about the optical fibers according to Embodiment 9 (hollow plot points in each figure). The region indicated by S1 in FIG. 43 is a region where the dispersion slope exceeds 0.009 ps/nm$^2$/ km, and the region indicated by S2 in FIG. 44 is a region where the fourth-order dispersion exceeds $1.0 \times 10^{-4}$ ps/nm$^3$/km.

In the relationship between widths of the wavelength band where the variation of chromatic dispersion is 0.5 ps/nm/km or less, and minimum absolute values of the fourth-order dispersion, as shown in FIG. 43, when the fourth-order dispersion in the wavelength range of 1520 nm to 1620 nm is $-1.8 \times 10^{-4}$ to $+1.8 \times 10^{-4}$ ps/nm$^3$/km, the width of the wavelength band where the variation of chromatic dispersion is 0.5 ps/nm/km or less is very wide, 150 nm or omre, which is desirable as a dispersion-flattened optical fiber. In the case of the optical fibers having any one of the refractive index profiles shown in each area (b) of FIGS. 1 to 3, when the fourth-order dispersion in the wavelength range of 1520 nm to 1620 nm is $-1.1 \times 10^{-4}$ to $+1.1 \times 10^{-4}$ ps/nm$^3$/km, the width of the wavelength band where the variation of chromatic dispersion is 0.5 ps/nm/km or less becomes wider, which is preferred.

In the relationship between widths of the wavelength band where the variation of chromatic dispersion is 0.5 ps/nm/km or less, and minimum absolute values of the dispersion slope, as shown in FIG. 44, the dispersion slope in the wavelength range of 1520 nm to 1620 nm is preferably $-0.009$ to $+0.009$ ps/nm$^2$/km. In the case of the optical fibers having either one of the refractive index profiles shown in each area (b) in FIGS. 2 and 3, the dispersion slope in the wavelength range of 1520 nm to 1620 nm is more preferably $-0.007$ to $+0.007$ ps/nm$^2$/km.

In the relationship between widths of the wavelength band where the variation of chromatic dispersion is 0.5 ps/nm/km or less, and ratios Ra, as shown in FIG. 45, the range where the ratio Ra is near 0.6 to near 0.75 is a desired region because the wavelength band is wide there.

MODIFIED EXAMPLES

The present invention is by no means limited to the above-described embodiments, but can be modified in various ways. For example, optical fibers according to the present invention may be polarization-maintaining optical fibers having the PANDA structure, BowTie structure, and Side Tunnel structure. In this case, the crosstalk between polarized waves is preferably $-15$ dB or less per 100 m of optical fiber because nonlinearity can be exhibited over a long period of time and on a stable basis, without occurrence of coupling between orthogonal polarization components.

As described above, the optical fibers according to the present invention achieve small values of chromatic dispersion and high nonlinearity over a broad band, so as to be able to efficiently generate SC light.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber comprising at least a center core region, and an outside cladding region having a refractive index lower than that of said center core region and provided on an outer periphery of said center core region, said optical fiber having, as characteristics with respect to light of a wavelength $\lambda 1$ in a wavelength range of 1520 nm to 1620 nm, a chromatic dispersion of $-2$ ps/nm/km to $+2$ ps/nm/km, a dispersion slope of $-0.009$ ps/nm$^2$/km to $+0.009$ ps/nm$^2$/km, and a fourth-order dispersion of $-1.8 \times 10^{-4}$ ps/nm$^3$/km to $+1.8 \times 10^{-4}$ ps/nm$^3$/km.

2. An optical fiber according to claim 1, wherein said optical fiber further has, as a characteristic with respect to light of a wavelength of 1550 nm, an effective area of 30 $\mu m^2$ or less.

3. An optical fiber according to claim 1, wherein, when $\lambda 2$ and $\lambda 3$ ($\lambda 2 < \lambda 3$) are defined as two wavelengths each of which is in a wavelength range of 1400 nm to 2000 nm and a difference between which is 150 nm or more, a variation of the chromatic dispersion of said optical fiber is 0.5 ps/nm/km or less in an entire wavelength range of $\lambda 2$ to $\lambda 3$.

4. An optical fiber according to claim 3, wherein the wavelength $\lambda 2$ is 1600 nm or less, and the wavelength $\lambda 3$ is 1800 nm or more.

5. An optical fiber according to claim 3, wherein the chromatic dispersion of said optical fiber falls within a range of $-2$ ps/nm/km to 0 ps/nm/km, in the entire wavelength range of $\lambda 2$ to $\lambda 3$.

6. An optical fiber according to claim 1, wherein said optical fiber has at least two zero dispersion wavelengths in a wavelength range of 1400 nm to 2000 nm.

7. An optical fiber according to claim 1, wherein said optical fiber further has, as a characteristic with respect to light of a wavelength of 1550 nm, a polarization mode dispersion of 0.2 ps/km$^{1/2}$ or less.

8. An optical fiber according to claim 1, wherein, when said optical fiber has a length of 100 m or more, a crosstalk between orthogonal polarization modes at a wavelength of 1550 nm is $-15$ dB or less.

9. An optical fiber according to claim 2, further comprising:

a first depressed region provided between said center core region and said outside cladding region, wherein a relative refractive index difference of said center core region with respect to the refractive index of said outside cladding region is 1% or more, and a relative refractive index difference of said first depressed region with respect to the refractive index of said outside cladding region is $-0.5\%$ or less.

10. An optical fiber according to claim 9, further comprising:

a ring region provided between said first depressed region and said outside cladding region and having a refractive index higher than those of said first depressed region and said outside cladding region.

11. An optical fiber according to claim 10, further comprising:

a second depressed region provided between said ring region and said outside cladding region and having a refractive index lower than those of said ring region and said outside cladding region, wherein said optical fiber has a fiber cutoff wavelength of 1620 nm or less.

12. An optical fiber according to claim 9, wherein a ratio Ra (=2a/2b) of an outside diameter 2a of said center core region to an outside diameter 2b of said first depressed region falls within a range of 0.6 to 0.75.

13. An optical device comprising:

a light source section for emitting seed light of a predetermined wavelength; and an optical fiber according to claim 1, in which the seed light emitted from said light source section propagates, said optical fiber outputting light of a wavelength different from that of the seed light, said output light being newly generated by a nonlinear optical phenomenon induced during propagation of the seed light in said optical fiber.

14. An optical device according to claim 13, wherein said light source section outputs light whose center wavelength is a wavelength $\lambda 4$ in the wavelength range of 1520 nm to 1620 nm, and wherein said optical fiber outputs light having a bandwidth of 200 nm or more.

15. An optical device according to claim 14, wherein said optical fiber outputs-broadband light having an intensity variation of 3 dB or less over an entire wavelength band with a width of 200 nm or more.

16. An optical device according to claim 14, wherein said optical fiber outputs broadband light having an intensity variation of 20 dB or less over an entire wavelength band with a width of 1 octave or more.

17. An optical device according to claim 13, wherein said said seed light includes a first portion whose center wavelength is a wavelength $\lambda 5$ in the wavelength range of 1520 nm to 1620 nm and a second portion whose center wavelength is a wavelength $\lambda 6$ ($\lambda 5 \neq \lambda 6$) in the wavelength range of 1520 nm to 1620 nm, and said optical fiber outputs light of a wavelength different from the wavelengths $\lambda 5$ and $\lambda 6$.

18. An optical fiber having, as characteristics with respect to light of a wavelength $\lambda 1$ in a wavelength range of 1520 nm to 1620 nm:

a chromatic dispersion of $-2$ ps/nm/km to $+2$ ps/nm/km;

a dispersion slope of $-0.009$ ps/nm$^2$/km to $+0.009$ ps/nm$^2$/km; and a fourth-order dispersion of $-1.8 \times 10^{-4}$ ps/nm$^3$/km to $+1.8 \times 10^{-4}$ ps/nm$^3$/km.

* * * * *